United States Patent [19]

Armstrong

[11] 3,795,865

[45] Mar. 5, 1974

[54] AUTOMATED REAL TIME EQUALIZED MODEM

[75] Inventor: Thomas R. Armstrong, Clearwater, Fla.

[73] Assignee: Honeywell Information Systems Inc., Waltham, Mass.

[22] Filed: Feb. 23, 1972

[21] Appl. No.: 228,552

[52] U.S. Cl. .................... 325/42, 178/69 R, 325/65, 328/162, 333/18, 333/28 R

[51] Int. Cl. .......................... H04b 7/00, H04b 1/62

[58] Field of Search ...... 178/69 R, 69 A; 179/170.2; 325/38, 41, 42, 65; 328/155, 162, 163; 333/18, 28 R

[56] References Cited

UNITED STATES PATENTS

| | | | |
|---|---|---|---|
| 3,479,458 | 11/1969 | Lord et al. | 325/42 |
| 3,401,342 | 9/1968 | Becker | 333/18 X |
| 3,093,707 | 6/1963 | Nicholson et al. | 340/146.1 AL X |

*Primary Examiner*—Eugene G. Botz
*Assistant Examiner*—R. Stephen Dildine, Jr.
*Attorney, Agent, or Firm*—Nicholas Prasinas; Ronald T. Reiling

[57] ABSTRACT

An Automated Real Time Equalized Modem (ARTEM) having multipath equalization by means of adaptive, quadrature matched filters and an adaptive transversal equalizer. ARTEM is a wideband (3kHz) system employing multilevel PAM-VSB (Pulse Amplitude Modulation-Vestigial Side Band) modulation and continuous real-time automatic channel measurement and equalization, wherein the channel pulse response is continually measured and equalized so that the modem receiver adapts itself to the varying HF medium.

20 Claims, 22 Drawing Figures

INPUT SEQUENCE −1 1 −1 1 1 1 −1 −1 1 −1 1 1 1 −1 −1
OUTPUT SEQUENCE 7 −1 −1 −1 −1 −1 −1 7 −1 −1 −1 −1 −1 −1 7

AUTOMATED REAL TIME EQUALIZED MODEM

BACKGROUND OF THE INVENTION

1. Field of the Invention

This invention relates in general to modems and particularly to automatic Real-Time Equalized Modems (ARTEM) and more specifically to an apparatus and a method for continuously monitoring and compensating for the time variant HF media telephone channels and localized subsystems.

2. Description of the Prior Art

In high speed data transmission over a nominal 3kHz channel several time-variant factors affect the reliability of data transmission and its recovery.

In a book entitled *Principles of Data Communication* by R.W. Lucky, J. Salz and E.T. Welden, Jr., published by McGraw-Hill Book Company in 1968 the authors detail a variety of problems in designing efficient transmitters and receivers for data communications. On page 11 and 12 of the above subject book the authors state:

"All real channels exhibit some form of time dispersion. In a high-frequency radio channel this dispersion may be due to multipath transmission, while in a telephone channel the dispersion can be attributed to the imperfect transfer characteristics of the transmission system. . . .

"A number of causes other than noise and linear distortion can result in the output of a channel being different from the input. . . . Among the miscellaneous impairments are non-linearities, frequency offset, and phase jitter [incidental frequency modulation (FM)].

"Non-linearities are always present in a communication system to some small extent because of the impossibility of achieving truly linear amplification or filtering. These types of non-linearities are largely negligible, but occasionally significant effects result when amplifiers are overloaded into operation in a highly non-linear region. Significant non-linearities also occur on the switched telephone networks owing to the action of voice companders (circuits designed to compress the later expand the dynamic range of speech signals).

"Frequency offset and phase jitter are other phenomena associated with telephone transmission. Both effects result from the use of a carrier system within the telephone channel. The voice frequency band, nominally 0 to 3kHz, is heterodyned or shifted in frequency to higher frequencies and then multiplexed with other voiceband signals to form a portion of a wideband signal.

"At a distant point this signal is demultiplexed and the original voice channels are separated. In heterodyning the voiceband back to baseband, the reference carrier may differ in frequency and phase from modulating carrier. Thus at the receiver the voiceband lies between $e$ to $(3+e)$ kHz, where $e$ is a frequency shift of typically a few cycles. This frequency offset makes the telephone channel technically a time-varying system since the response to an applied impulse is a function of the time at which the impulse was applied. However, the offset is unimportant from a theoretical point of view since it represents a simple and constant transformation of the transmitted wave. In practice it can be simply removed at the receiver.

"In addition to the frequency offset the instability of the modulating- and demodulating-carrier generators causes a *random jitter* (italics added) in the phase of the received signal. This jitter is equivalent to a low-index, random-frequency modulation of the transmitted signal and is consequently termed incidental FM. The severity of the incidental FM depends in large part upon the kind of carrier system used on a particular connection."

Hence in order for a data communication system to achieve minimum probability of error in a given data call, it is necessary to compensate for the corruption of the message due to dispersion, frequency offset, non-linearities and other random or time varying effects of the channel. Traditionally equalization has been used to mitigate the effects of intrinsic residual distortion by including "within the data system an adjustable filter or adjustable filters which can be trimmed to fit closely the required characteristics for any individual data call. . . . At the receiver, for example (in addition to the usual receiver filter of perhaps the raised-cosine form), we require (1) a filter capable of being adjusted to match the exact channel characteristic and (2) an infinite transversal filter whose tap gains are adjusted to eliminate intersymbol interference.

"In reality any adjustable filter can only have a finite number of variable parameters, and no characteristic can be fitted exactly. Furthermore, the cost of the adjustable filter (equalizer) will usually be directly proportional to the number of variable parameters. Now given only, say, N adjustable coefficients in an equalizer, it is by no means clear that the form of the equalizer should approximate the form of the optimum filters discussed in the previous chapter. The problem becomes one of finding the type of adjustable filter best able to compensate for the ensemble of possible channel characteristics having the least number of variable parameters." (pps. 128–129 of above referenced Lucky et al., book.) With these limitations in mind Lucky et al. goes on to describe some available techniques in Chapter VI. In summary "bump equalizers" have been used which comprise a sequence of bandpass filters, each tuned to a different portion of the data band and adjustable in gain. Also "transverse filters" have been utilized which comprise basically a delay line tapped at T-sec intervals, each tap being connected to a variable gain (which can be negative) to a summing bus. Methods of automatic equalization are also discussed whereby the data communication system "learns" the channel characteristics and attempts to bring the performance of the system closer to the ideal system. Typical automatic equalization systems are described beginning on p. 156 of the above referenced Lucky book, which equalization is based on preset and adaptive equalization. In preset equalization the system is adjusted prior to, or during breaks in data transmission, whereas is adaptive equalization continuous adjustment during data transmission is utilized.

SUMMARY OF THE INVENTION

Briefly the invention herein disclosed comprises an *automated real-time equalized modem* (ARTEM) system employing multilevel PAM-VSB modulation and continuous real-time automatic channel measurement and equalization. The channel pulse response is continuously measured and equalized by means of adaptive, quadrature matched filters and an adaptive transversal equalizer, so that the modem receiver adapts itself to the varying HF media.

The ARTEM modulator employs 4 or 8 level, PAM-VSB modulation (pulse amplitude modulation-vestigial side band). This type of modulation scheme is relatively simple and very efficient with respect to required bandwidth. If 4 level PAM is transmitted, one bit of data and one bit of known PN (Pseudo Noise) sequence are encoded into one of the four PAM levels while if 8 level PAM is transmitted, two data bits and one PN bit are encoded into one of the 8 levels. Since the PN sequence is known at the receiver, it is used to provide channel characteristic information.

The receiver comprises a signal processor, carrier recovery and data detect subsystems. The carrier recovery subsystem is further comprised of a frequency tracking system, phase estimator and phase corrector. The carrier recovery subsystem comprises essentially a quadrature demodulator, adaptive matched filters and an adaptive transversal equalizer. Using information provided by the known PN sequence, the matched filters and transversal equalizer are continuously updated as the propagation characteristics of the HF channel vary in time. Essentially, the receiver recombines the distorted multipath impulse response which is undistorted. Due to the action of the adaptive matched filters, the receiver is relatively insensitive to phase errors in the carrier recovery and baud timing oscillaotrs.

The data detector is an M to 4 or M to 8 level converter followed by a parallel to serial converter, where M is the number of digital levels employed in the system.

OBJECTS

It is an object, therefore, of the instant invention to provide an improved high frequency modem.

It is a further object of the invention to provide for reliable high speed data transmission (4.8 kilobits per sec) over a nominal communication channel.

It is still a further object of the instant invention for providing a data communication system which continuously measures the channel pulse response and equalizes it so that the modem receiver adapts itself to the varying HF medium.

Another object of the instant invention is to provide multipath equalization by means of adaptive, quadrature matched filters and an adaptive transversal equalizer.

Other objects and advantages of the invention will become apparent from the following description of the preferred embodiment of the invention when read in conjunction with the drawings contained herewith.

DESCRIPTION OF THE PREFERRED EMBODIMENT

GENERAL

ARTEM is basically a high speed HF modem system which employs PAM-VSB (pulse amplitude modulated-vestigial side band) transmission and an adaptive receiver which continuously monitors and compensates for the time variant HF media. Employing approximately 2,700 Hz of bandwidth the transmitter operates at a symbol rate of 4,800 symbols per second.

It should be noted that as used in this disclosure VSB also includes Single Side Band transmission as SSB is simply a special case of VSB. Additionally, the PAM technique applies to all data formats, both correlated and uncorrelated prior to modulation. An example of uncorrelated data systems is the full response system discussed in detail in this disclosure. Some representative correlated data formats are the partial response family of formats.

The Channel

Figure 1:
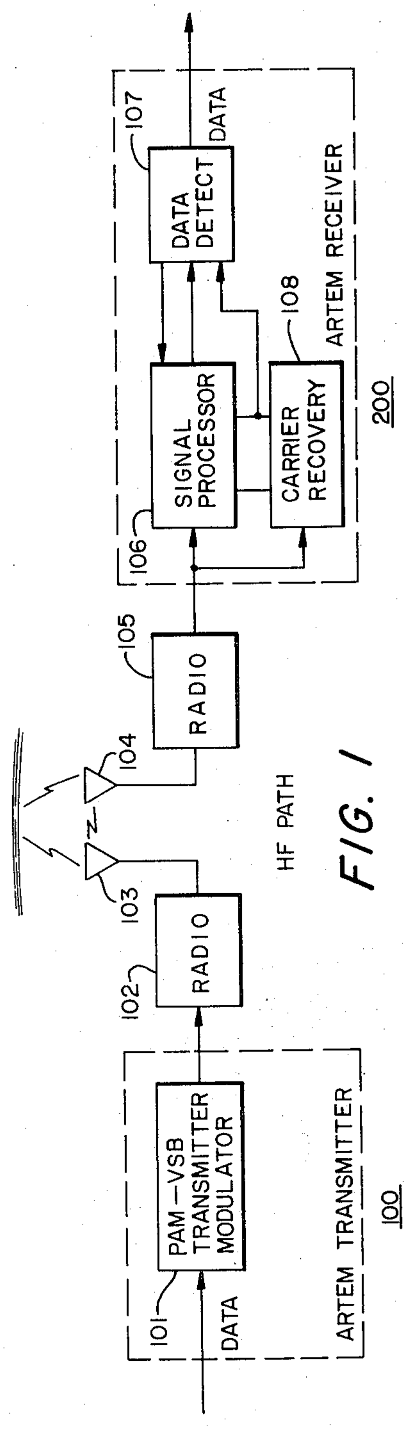
FIG. 1 is a block diagram of an ARTEM transmitter-receiver basic channel.

A basic channel of the ARTEM system is shown in FIG. 1 in block diagram form. The channel is composed of the SSB-HF (single side band high frequency) radios 102, 105 and the physical HF medium. The HF channel may be modeled in baseband as the parallel connection of two or more paths each of which may be described in terms of several time varying parameters. Specifically, the parameters for each of these paths are doppler shift, path time delay, and path gain. If the transmission range is less than 2000 miles, normally only two distinct paths are present. The two path model contains essentially four major time variable parameters. First, each path contains a common doppler shift $\Delta Ft$ which is caused by a relative movement between the radio transmitting and receiving antennas. This doppler shift can be as large as ± 75 Hz in an aircraft-to-ship transmission if the transmitter is contained in MACH 3 aircraft and operating at a frequency of 25 MHz. Second, an absolute time delay $T_t$ is common to all paths and the rate of change of the time delay is in the order of $3 \times 10^{-6}$ seconds per second if the distance between transmitter and receiver is changing at a rate of MACH 3 and is generally negligible. Third, a single gain variable $G_t$ describes the relative path strengths of the two paths where one path is assigned a value of unity. Typical values of $G_t$ are +½ and −½ while the rate of change of $G_t$ is in the range of 0.2 to 3Hz. Finally a differential time delay $\Delta\tau$ ranges from 0 to 4 milliseconds.

Transmitter

Figure 2:
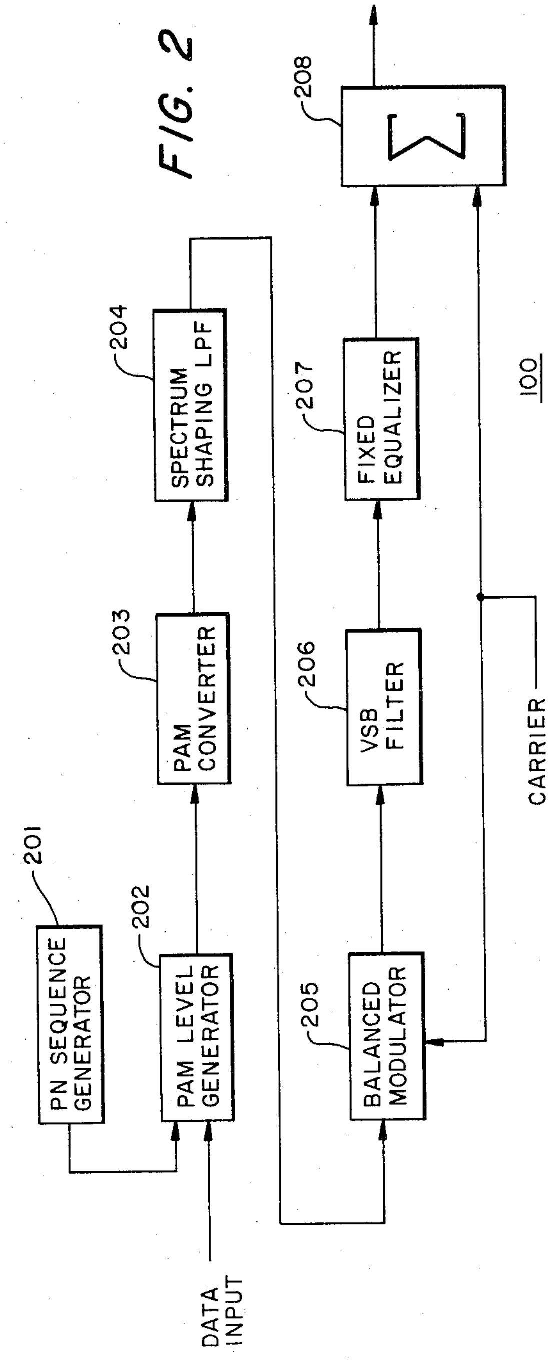
FIG. 2 is a more detailed block diagram of the ARTEM transmitter or modulator.

Referring to FIG. 2 there is shown the basic ARTEM transmitter 100. The ARTEM transmitter of modulator 100 employs 4 or 8 level, PAM-VSB modulation. This type of modulation scheme is widely used in high data rate wireline modems as it is relatively simple and very efficient with respect to required bandwidth. If 4 level PAM is transmitted, one bit of data and one bit of a known PN (Pseudo Noise) sequence are encoded into one of the four PAM levels while if 8 level PAM is transmitted, two data bits and one PN Bit are encoded into one of the 8 levels. Since the PN sequence is known at the receiver, it is used to provide channel characteristic information. In 2,400 Hz of bandwidth (for example) a symbol rate of 4,800 symbols per second may be achieved. Four level PAM then provides a data rate of 4,800 bauds while 8 level PAM yield 9,600 bauds.

Referring again to FIG. 2 a sequence generator 201 outputs a known, repetitive sequence of 63 bits, although other quantities may be used. The sequence generator is further comprised of a 6 bit shift register whose taps are set according to the algorithm:

$$1 \oplus X^6 \oplus X^7$$

where the symbol $\oplus$ stands for modulo 2 addition. Each stage of the register stores one binary digit which is serially transferred from left to right at the clock rate.

The PAM level converter 203 encodes one PN bit, $p_k$, and one or more data bits, $d_k$, into a PAM level $a_k$. If 4-level signalling is employed, the encoding relation is:

$$a_k = (2/3)p_k + (1/3)\, d_k.$$

If the signalling is 8 level, two data bits, $d_k$ and $d'_k$, and one PN bit are coverted into a level according to the equation:

$$a_k = (4/7)p_k + (2/7)d_k + (1/7)d'_k.$$

Tables I and II below show examples of 4 level and 8 level encoding respectively.

TABLE I

4 LEVEL ENCODING

| PN bit $p_k$ | Data bit $d_k$ | PAM level $a_k$ |
|---|---|---|
| 1 | 1 | 1 |
| 1 | −1 | ⅓ |
| −1 | 1 | −⅓ |
| −1 | −1 | −1 |

TABLE II

8 LEVEL ENCODING

| PN bit $p_k$ | First data bit $d_k$ | Second data bit $d'_k$ | PAM Level $a_k$ |
|---|---|---|---|
| 1 | 1 | 1 | 1 |
| 1 | 1 | −1 | 5/7 |
| 1 | −1 | 1 | 3/7 |
| 1 | −1 | −1 | 1/7 |
| −1 | 1 | 1 | −1/7 |
| −1 | 1 | −1 | −3/7 |
| −1 | −1 | 1 | −5/7 |
| −1 | −1 | −1 | −1 |

The PAM converter 203 produces a series of impulses whose weights are determined by the value of the levels $a_k$. These pulses are then passed through the spectrum shaping LPF (low pass filter) 204 whose impulse response is a causal approximation to sine $(at)/(at)$. After processing by the balanced modulator 205 the signal spectrum occupies a frequency band from 500Hz to 5500Hz.

The VSB (vestigial side band) filter 206 reduces the energy above the 3,000Hz carrier, and finally the VSB signal is passed through a fixed equalizer 207 which partially compensates for fixed channel distortions which may be attributed to ratio transfer characteristics, etc.

As mentioned supra the ARTEM modulator utilizes PAM-VSB modulation although the invention may be practiced with other modulation schemes as SSB (single side band) or DSB (double side band). VSB transmission is actually a compromise between DSB which is wasteful of bandwidth and SSB which is difficult to mechanize due to filter requirements and carrier recovery problems. VSB requires only slightly more bandwidth than SSB while requiring simpler filters and providing a residual carrier which may be recovered for the purposes of demodulation and phase correction. Indeed, SSB is simply a special case of VSB.

Figure 3:
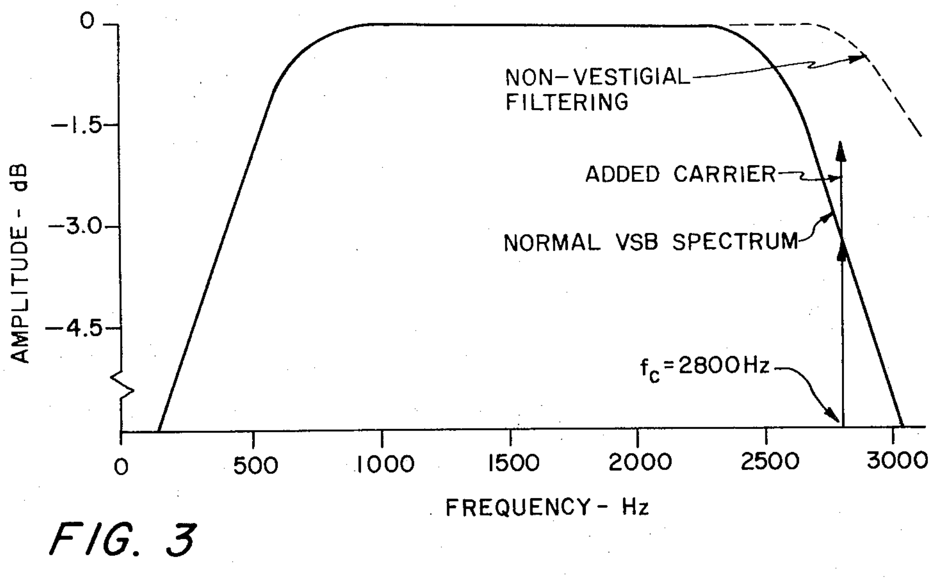
FIG. 3 is a graph of a typical amplitude vs frequency spectrum of the ARTEM system.

In order to track carrier frequency (to be described infra) and assist in carrier phase jitter recovery the normal VSB spectrum is modified by inserting carrier frequency power and permitting the transmitted spectrum to be approximately DSB in the vicinity of the carrier. (See FIG. 3). The summer 208 of FIG. 2 adds the carrier to the output signal.

ARTEM Receiver

Figure 4:
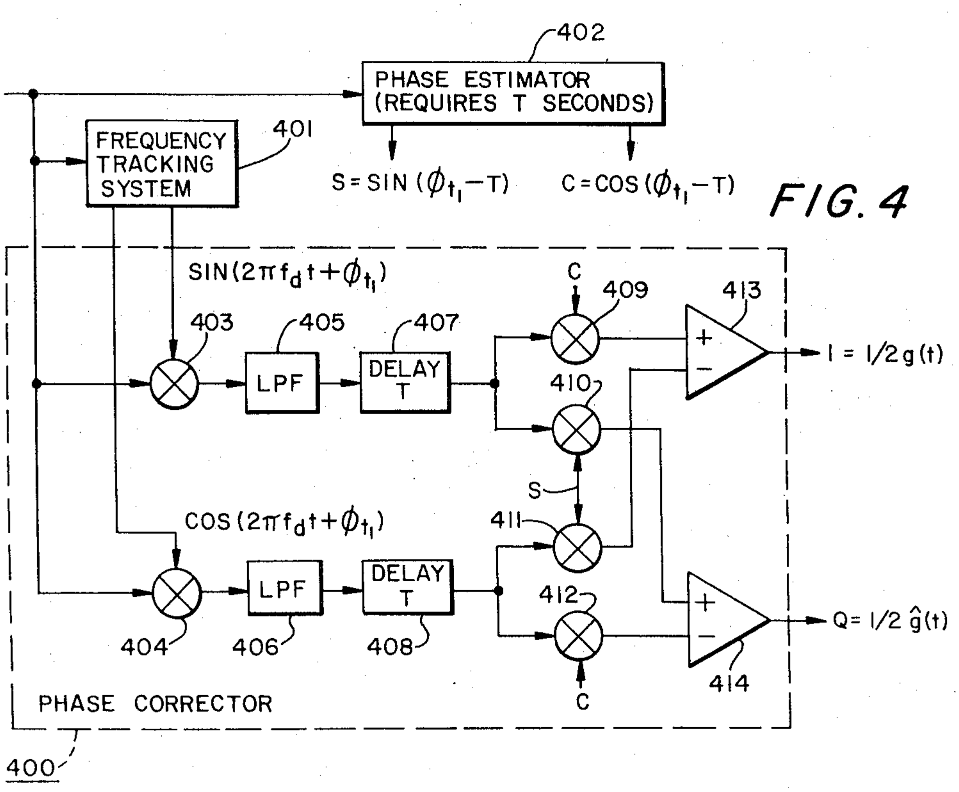
FIG. 4 is a block diagram of the carrier recovery subsystem showing details of the supplemental phase corrector.

As shown in FIG. 1 the ARTEM receiver 200 is comprised of a signal processor 106, data detector 107, and carrier recovery 108. Most pertinent to tbe instant invention is the carrier recovery subsystem which although shown as a separate block is essentially an integrated subsystem forming a part of the ARTEM receiver. Essentially the function of the carrier recovery subsystem shown in greater detail on FIG. 4 is to demodulate the VSB signal to baseband with a "best" carrier frequency estimate and, in addition, to provide a supplemental carrier phase correction.

Figure 5:
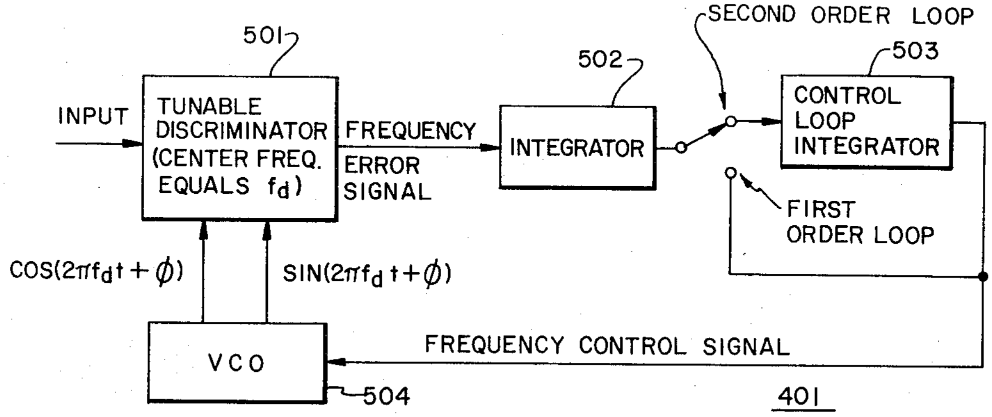
FIG. 5 is a block diagram showing details of the frequency tracking system.

The carrier recovery system may be partitioned (for ease of explanation) into three major functional subassemblies which comprise the phase corrector 400, the frequency tracking system 401, and the phase estimator 402. In constrast to a normal phase lock loop which typically tracks, or is affected by, both frequency and phase, the system of FIG. 4 divorces the operations of tracking frequency and tracking phase. Estimation of a "best" carrier frequency is the first function of the carrier recovery system. As shown in greater detail on FIG. 5 this is accomplished by the frequency tracking system which operates as either a first or second order frequency locked loop. It is important to note that as a frequency locked loop this system does not attempt to track, nor is it affected by the phase of the incoming carrier(s). Given an input of one or more apparent carriers, separated in frequency due to differential doppler, this system selects a carrier frequency which corresponds to the centroid of the energy of the multiple receiver carriers. The input then is that portion of the received spectrum in which the carriers may be expected to lie. The outputs are sine and cosine signals at a "best" estimate of the carrier frequency and at an arbitrary phase.

Input to the carrier frequency tracking system is supplied directly to a tunable discriminator 501 whose center frequency is determined by the VCO (voltage controlled oscillator) 504 output. If the discriminator center frequency does not correspond to the centroid of the incoming carrier energy, an error signal is fed to one or two integrators 502 and 503, which in turn feed the VCO 504. The loop is first or second order depending upon whether one or two integrators are included in the loop. In the first order mode, if a selective fade removes the incoming carrier energy, the loop frequency remains fixed until the carrier energy reappears. However, in the second order mode, if a fade were to occur when the loop was tracking a rate of change in carrier frequency of, for example, 2Hz per second, the loop would continue to shift frequency at a rate of 2Hz per second until the carrier energy reappeared. In a sense, the second order loop uses past history to predict the proper carrier frequency during a frequency selective fade.

The sine and cosine of the estimated "best" carrier frequency are used to demodulate the input signal. Subsequent to this quadrature demodulation the two resultant baseband signals are passed through a carrier phase compensation system shown in FIG. 4, which is comprised of a phase estimator 402 and a phase corrector 400.

The theory behind the phase corrector is as follows. At any given time there exists an optimum phase for demodulating the VSB signal. However, since this phase is not known, nor may it be instantaneously computed, the passband waveform is demodulated by quadrature carriers at an arbitrary phase angle. All the information in the original signal can be shown to be preserved in the two quadrature waveforms, and these quadrature waveforms are stored in the two delay lines. At a later time the proper phase is computed by the phase estimator 402. The signal is delayed T seconds as the phase estimator 402 requires this amount of time for estimating the proper phase. Given the phase correction, the delayed quadrature signals are then subjected to a transformation which corrects for any phase error introduced by previously demodulating the signal at an arbitrary phase.

Mathematically the phase corrector operation is straight forward. Suppose the VSB signal as represented by:

$s(t) = g(t) \sin (2\pi f_{d}t) + \hat{g}(t) \cos (2\pi f_{d}t)$ where $g(t)$ = the desired baseband signal $\hat{g}(t)$ = the Hilbert transform of $g(t)$ $f_d$ = the carrier frequency $t$ = time is demodulated by demodulator 403 by the function $\sin (2\pi f_{d}t + \phi)$ yielding $I'(t)$.

where $\phi$ = the phase error of the demodulator $I'(t)$ = the in-phase demodulator output.

It may be shown by trigometric identities that I'(t) is given by $$I'(t) = s(t) \cdot \sin (2\pi f_{d}t + \phi)$$

$$= g(t) \cdot \tfrac{1}{2} \cos \phi - g(t) \cdot \tfrac{1}{2} \cos (4\pi f_{d}t + \phi) + \hat{g}(t) \cdot \tfrac{1}{2} \sin \phi + \hat{g}(t) \cdot \tfrac{1}{2} \sin (4\pi f_{d}t + \phi).$$

After low pass filtering through LPF 405, and delayed by time T at delay line 407, the resultant $\hat{I}(t')$ is:

$$\hat{I}(t') = \tfrac{1}{2}g(t') \cos \phi + \tfrac{1}{2}\hat{g}(t') \sin \phi$$

where t' = the delayed time reference $\hat{I}(t')$ = the delayed, jitter corrupted, in-phase signal.

In similar fashion, let $g(t)$ be demodulated by demodulator 404 by the quadrature reference $\cos (2\pi f_{d}t + \phi)$ and low pass filtered by LPF 406 and delayed by a time T at delay line 408 to yield $\hat{Q}(t')$ when $\hat{Q}(t')$ = the delayed, jitter corrupted, quadrature signal.

It may be shown that:

$\hat{Q}(t')$ is given by $$\hat{Q}(t') = -\tfrac{1}{2}\, g(t') \sin \phi + \tfrac{1}{2}\, \hat{g}(t') \cos \phi.$$

The above $\hat{I}(t')$ and $\hat{Q}(t')$ are the specific signals which were demodulated at the improper phase angle $\phi$ and stored in the delay lines. At a later time, $\cos \phi$ and $\sin \phi$ are computed. The desired component $g(t)$ may then be obtained by the following transformation of coordinates or matrix multiplication:

$$\begin{bmatrix} \cos \phi & \sin \phi \\ -\sin \phi & \cos \phi \end{bmatrix} \begin{bmatrix} \hat{I}(t') \\ \hat{Q}(t') \end{bmatrix} = \begin{bmatrix} \tfrac{1}{2}g(t') \\ \tfrac{1}{2}\hat{g}(t') \end{bmatrix} \quad \text{Eq. (14-1)}$$

The $\hat{g}(t')$ term is not necessarily used or computed.

Thus, the phase corrector is able to compensate for a phase error occurring in the demodulation process. The above matrix multiplication is performed by the four multipliers 409, 410, 411, and 412 of FIG. 4, and the addition is performed by the two summers 413 and 414 of FIG. 4.

In the above discussion, it was assumed that a subsystem 402 of FIG. 4 existed which was capable of estimating the proper carrier phase after a delay of T seconds. Details of this subsystem are shown in FIG. 6.

Figure 6:
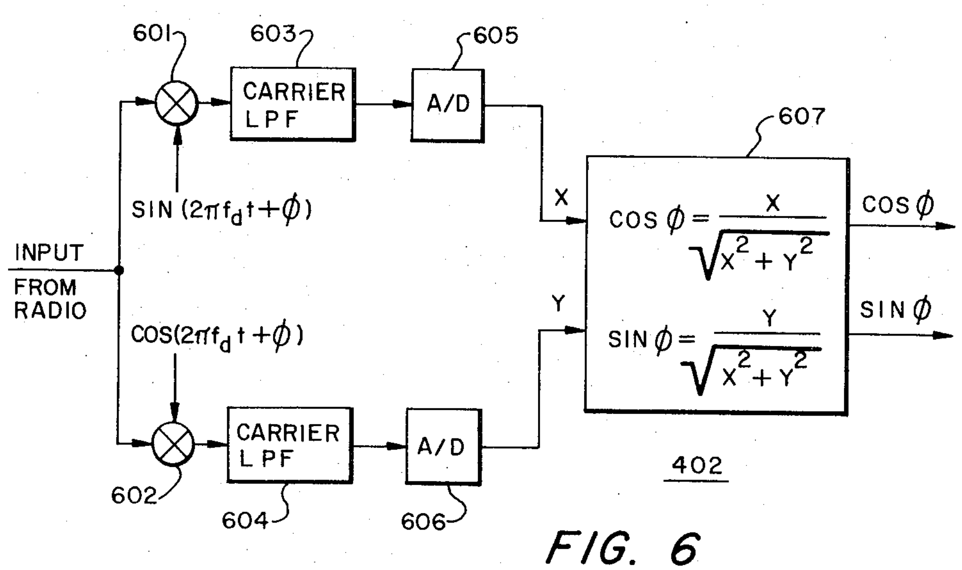
FIG. 6 is a block diagram showing details of the phase estimator for estimating proper carrier phase.

Referring to FIG. 6 operation of the carrier phase estimator may be readily explained by recalling the fact (supra) that in a small region about the carrier the VSB spectrum appears to be double sideband. Thus, in a small region centered about the carrier, $\sin (2\pi f_{d}t)$, the pass band signal $m(t)$ may be described as:

$$m(t) = (k + g(t)\ ) \sin (2\pi f_{d}t)$$

$k$ = additional carrier power due to insertion of a carrier beacon in the transmitter $t$ = time $g(t)$ = baseband data signal $f(t)$ = carrier frequency.

Suppose $m(t)$ is demodulation by quadrature demodulators 601 and 602, at a phase error angle $\phi$ and the carrier is low pass filtered through LPF's 603 and 604, yielding the quadrature components X and Y given by:

$$X(t) = \tfrac{1}{2}\, [k + g(t)] \cos \phi \quad (15\text{-}1)$$

$$Y(t) = \tfrac{1}{2}\, [k + g(t)] \sin \phi \quad (15\text{-}2)$$

where $X(t)$ = recovered in-phase carrier beacon $Y(t)$ = recovered quadrature carrier beacon.

The sine and cosine of the demodulation phase error $\phi$ may then be obtained according to the relation:

$$\cos \phi = X/\sqrt{x^2 + Y^2}$$
$$\sin \phi = Y/\sqrt{X^2 + Y^2}$$

One way of computing the above values is to use a general purpose digital computer such as the Honeywell 6000.

For example, it can be demonstrated that if the low pass filters employed in the phase estimator 402 are 10Hz, a delay of approximately T=20 milliseconds is encountered from the time the incorrect phase was used for demodulation until the time $\phi$ could be estimated by the circuit above. Thus, a T second delay is needed in the demodulated signal before the correction may be applied.

It was mentioned supra that in the ARTEM carrier recovery system, it is advantageous to separate the carrier frequency tracking process from the carrier phase tracking process. The reason for this is that when the recovered carrier beacon fades to a small amplitude the phase often varies very rapidly thus producing large short term variations in the instantaneous frequency of the recovered beacon; however, when the recovered beacon regains enough amplitude to become significant, the average frequency of the recovered beacon is usually the same as it was before the fade. Therefore, the requirement for tracking carrier frequency is the ability to adjust the frequency tracking system only when the amplitude of the carrier beacon is significant and to build enough inertia into the system to enable it to extrapolate from past history during intervals when the received beacon amplitude is inadequate. Systems of this type are used for tracking the beacons of navigation satellites.

Another requirement of the frequency tracking loop is that it must have a wide enough bandwidth to acquire carrier beacons offset by as much as ± 75 hertz from the nominal frequency and yet have a narrow bandwidth in the sense tbat the averaging time used for measuring carrier frequency must be fairly long (for example, 100 milliseconds) in order to average out the short term effects of noise fading and data.

Figure 7:
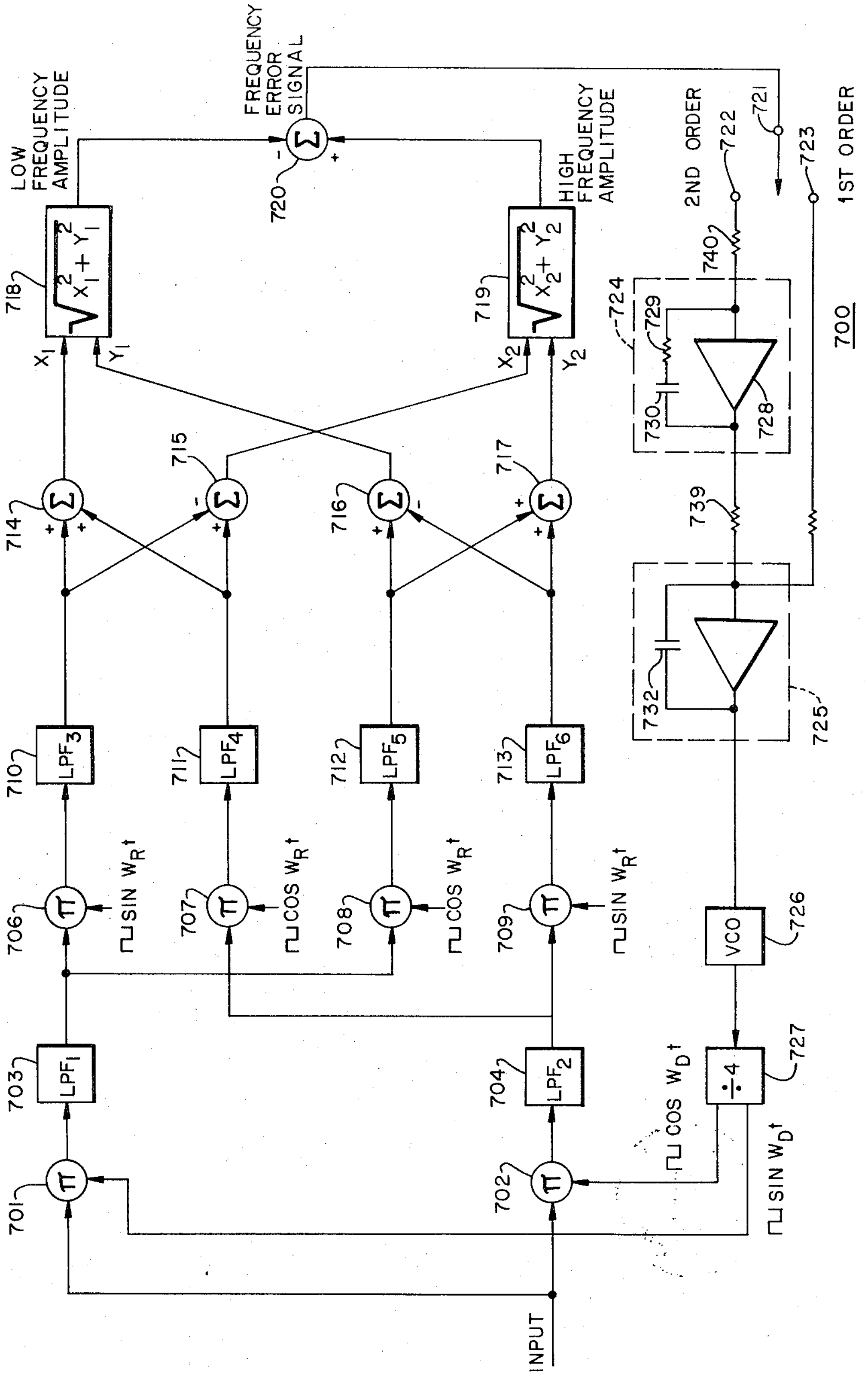
FIG. 7 is a detailed block diagram of the centroid frequency tracking system.

It is not feasible to build a phase lock loop which satisfies the above requirements; however, the requirements can be satisfied by using a frequency tracking system. One such system is shown in FIG. 7. The upper portion of the figure is simply a discriminator for producing the frequency error signal that is applied through one or more integrators 724 and 725 to the voltage controlled oscillator (VCO) 726 which runs at 4 times the carrier frequency. Digital logic circuits 727 divide the oscillator output by four to obtain two square waves which are at the carrier frequency and are exactly 90° apart in phase. These square waves control the demodulators 701 and 702 which demodulate the input signals to recover the carrier beacon. If low pass filters 703 and 704 have for example a 75 hertz bandwidth then input signals within 75 hertz of the demodulator drive frequency, $f_d$, will pass through these filters. The result is that these two demodulators and filters act like a band pass filter with a total band width of 150 hertz centered about the demodulator frequency, $f_d$, as shown on FIG. 9*a*. These two filters 703 and 704 limit the bandwidth of the input signals permitted to reach the discriminator. The next four modulators 706, 707, 708 and 709, low pass filters 710, 711, 712 and 713 and combining network 714, 715, 716 and 717, function like band pass filters centered about $f_d - f_r$ and $f_d + f_r$ where $f_r$ is the frequency used to drive these four modulators. The four modulators shift the output of low pass filters 703 and 704 both upward and downward by $f_r$ resulting in double side band spectra. Low pass filters 710 through 713, remove harmonics of the square wave modulation process and produce a gradual attenuation of amplitude versus frequency. When the outputs of low pass filters 710 and 711 are added, one set of signal components cancel and the other set adds so that only effects centered around the frequency $f_d - f_r$ remain. When the outputs of these two filters are subtracted, the opposite sets' components cancel and add, thus, only the effects centered around $f_d + f_r$ remain.

If the input signal is a sinusoid then X and Y will be sinusoids which are equal to amplitude and 90° in phase with respect to each other. Since $\text{sine}^2 + \text{cosine}^2$ is equal to 1, the instantaneous peak amplitude can be obtained by squaring X, squaring Y, adding them, and taking the square root of the sum. Since the output does not depend upon the particular phases of X and Y, it does not vary with time and hence, no low pass filtering is required.

Figure 9A:
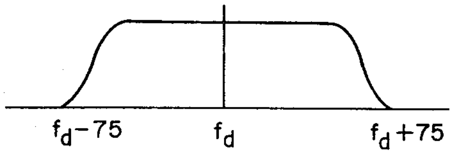
FIGS. 9A–9E are amplitude vs frequency curves of bandpass and discriminator characteristics of the invention.
Figure 9B:
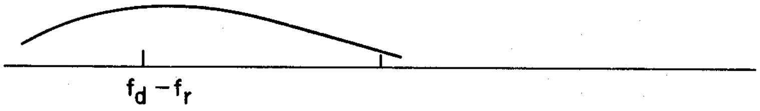
Figure 9C:
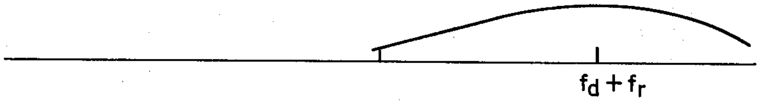
Figure 9D:
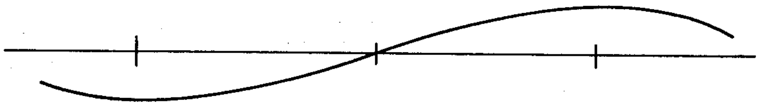
Figure 9E:
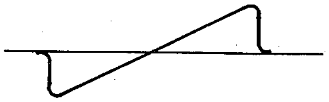

When the output of the low frequency narrow band filter is subtracted from that of the high frequency narrow band filter the difference signal shown on FIG. 9D is obtained. When the band pass filter effects of low pass filters 703 and 704 are also considered, the band pass effect shown on FIG. 9A is also obtained producing the results shown on FIG. 9E. FIG. 9B shows the band pass effects (BPF) when low pass filters 710, 711, 712 and 713 act with the modulators 706, 707, 708 and 709 and their outputs are combined to form $X_1$ and $Y_1$. FIG. 9C shows the BPF effects when LPF's 710, 711, 712 and 713 act with modulators 706, 707, 708 and 709 and their outputs are combined to form $X_2$ and $Y_2$. The effect of FIG. 9C minus the effect of FIG. 9B produces the effect of FIG. 9D which gives an overall effect of a discriminator.

The averaging time of the frequency track loop can be adjusted by changing the values of the capacitors 732 and 730 and resistors 739 and 740 associated with the integrators 725 and 724 respectively which are shown at the bottom of FIG. 7. The switch 721 permits the operator to choose between a first order frequency lock loop 722 and a second order frequency lock loop 723. If the switch were in the first order mode when the carrier beacon fades away, then the frequency track system would tend to remain constant until the beacon reappeared. On the other hand, if the frequency track loop were operating in the second order mode and the carrier beacon has been ranging in frequency at a constant rate of, for example, 2 hertz per second before it disappeared, then the output of the frequency tracking loop would tend to continue changing at a rate of 2 hertz per second until the beacon reappeared. In this mode, the system would tend to track the center of mass of the received beacon spectrum rather than track any particular beacon image. Any unbalance in the beacon spectrum with respect to the demodulator drive frequency would produce an error signal out of the discriminator and thereby adjust the local VCO, 726, frequency.

By locking on the average frequency rather than on the particular tone the frequency lock loop tends to reduce the rate at which the carrier frequency tracking system changes. For example, assume the two carrier beacon signals are recovered which have approximately the same amplitude and are separated by 2 hertz in frequency. If the frequency tracking system were to lock on one of these signals the other would cause the recovered beacon to beat a a two hertz rate. By locking midway between these two tones the beat rate can be reduced to 1 hertz per second. This is one of the features which makes it desirable to track the centroid of the pilot tone spectrum rather than track the largest single component. Another advantage of the centroid tracking approach is that when several beacons are being watched simultaneously using a fairly wide input bandwidth to the discriminator, it becomes very unlikely that a spurious pilot tone will capture the frequency lock loop and drag it far enough away from the central beacon such that the tracking loop will not be able to recover. A more conventional phase lock loop can be used in place of the above frequency lock loop depending upon the type and magnitude of the channel degradations involved.

Figure 8:
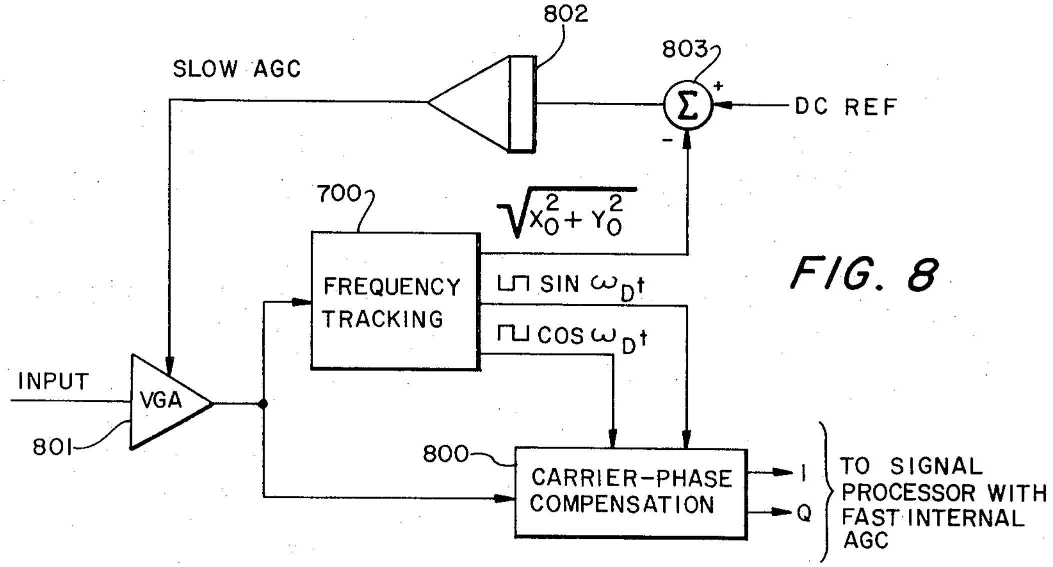
FIG. 8 is a block diagram of the carrier recovery subsystem.

The interconnections between the frequency tracking module 700 and the carrier phase compensation module 800 are shown in FIG. 8. The input signal comes from the HF receiver although other data channels can be used. The I and Q output signals go to the signal processor (not shown) which may perform an adaptive match filtering and/or real-time equalization to recover the data signals or may not do any of these functions. The signal processor may also perform automatic gain control operations and carrier phase compensation operations internally. The frequency tracking module 700 furnishes demodulator drive signals to the carrier phase compensation system 800. In cases where the carrier frequency uncertainty is small the carrier tracking system may be replaced with a fixed frequency oscillator.

A frequency offset may be equated to a phase error which varies linearly with time. If the variation is slow enough, the phase compensation system will be able to detect and correct for this time varying error.

Figure 10:
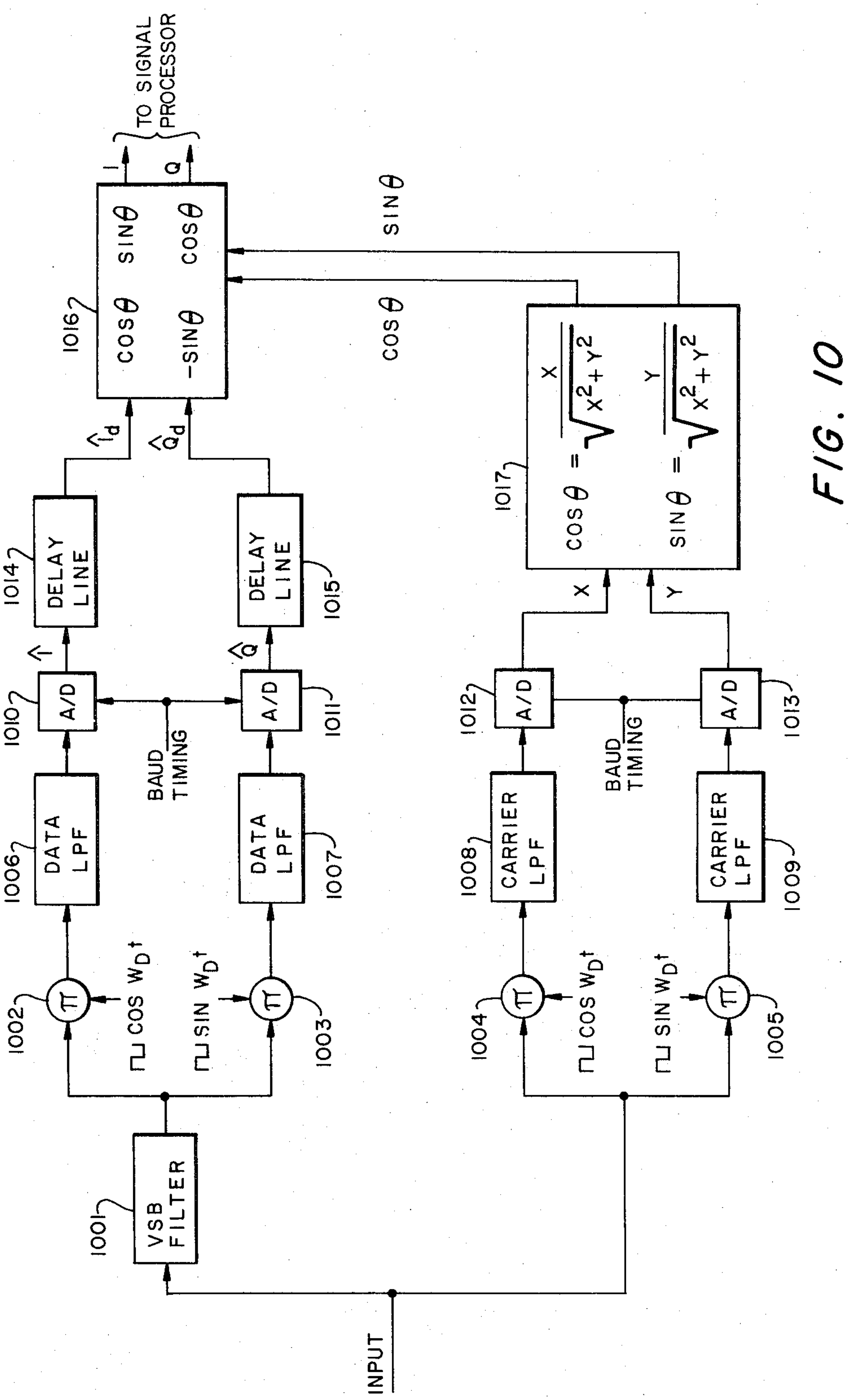
FIG. 10 is a block diagram of the phase jitter compensator.

Referring now to FIG. 10, a VSB filter 1001 is coupled to the upper two demodulators 1002 and 1003 for demodulating in quadrature the data from the carrier. The two lower quadrature demodulators 1004 and 1005 respectively are also coupled to the input and although shown on FIG. 10 as separate demodulators as those from 1002 and 1003 may in fact be the same. Two separate demodulators are shown in FIG. 10, however, for ease of explanation. The input signals for demodulators 1004 and 1005 may be from the input or output of the VSB filter or elsewhere provided that the delays in 1014 and 1015 are adjusted accordingly. The quadrature data signals are processed through two data low pass filters 1006 and 1007 respectively and subsequently through two analog-to-digital converters 1010 and 1011. The two output signals from the analog-to-digital converters are designated $\hat{I}$ and $\hat{Q}$ and are further processed through delay lines 1014 and 1015 respectively so that the phase correction signals used for adjusting any particular pair of data samples have the same delay as the data samples, making use of information which is past, present, and future with respect to the data samples being corrected. $\hat{I}$ and $\hat{Q}$ signals are delayed and then applied to a coordinate transformation module 1016 which is mathematically equivalent to a resolver and rotates the $\hat{I}$ and $\hat{Q}$ signals by the desired angle $\theta$ to obtain the compensated digital in-phase and quadrature signals I and Q. The coordinate transformation module 1016 can be implemented by using a general purpose digital computer such as the Honeywell series 6000 programmed in accordance with the matrix rotation equation (14–1). These compensated signals I and Q, are the same as the signals which would have been obtained if the phase correction $\theta$, could have been applied to the in-phase and quadrature demodulators prior to the time the signals were originally demodulated. Thus, the coordinate transformation compensates for the measured carrier phase error.

The apparatus for determining the carrier phase error angle $\theta$, is shown in the lower half of FIG. 10. The quadrature components of the demodulated carrier signal are applied to carrier low pass filters 1008 and 1009 respectively and are analog signals to these LPF's 1008, 1009. The filtered signals are then applied to analog-to-digital converters 1012 and 1013 which convert these quantities into the digital outputs designated X and Y. Since the beacon is injected in-phase with the data, at the transmitter, the data on both sides of the carrier beacon has the same phase angle as the beacon itself, and the data looks like it is an amplitude modulation rather than a phase modulation relative to the carrier beacon. (This is so because as has been explained supra the VSB signal in order to assist in carrier recovery was modified by the insertion of carrier frequency power in-phase with the data and by permitting the transmitted spectrum to be approximately double side band in the vicinity of the carrier. See FIG. 3). Hence close to the carrier the data signal looks like a DSB AM signal and not like a VSB or SSB signal. The digital signals X and Y therefore are the amplitude of the recovered carrier beacon in the in-phase and quadrature demodulator channels. The signs of these two outputs X and Y and their ratio are used to compute the carrier phase error angle $\theta$; however, it is not the angle $\theta$ but sine $\theta$ and cosine $\theta$ which are actually needed in the digital resolver 1016. Therefore the computer hardware 1017 computes sin $\theta$ and cos $\theta$ from X and Y. A general purpose computer can be used to perform this computation.

Signal Processor Subsystem

Figure 11:
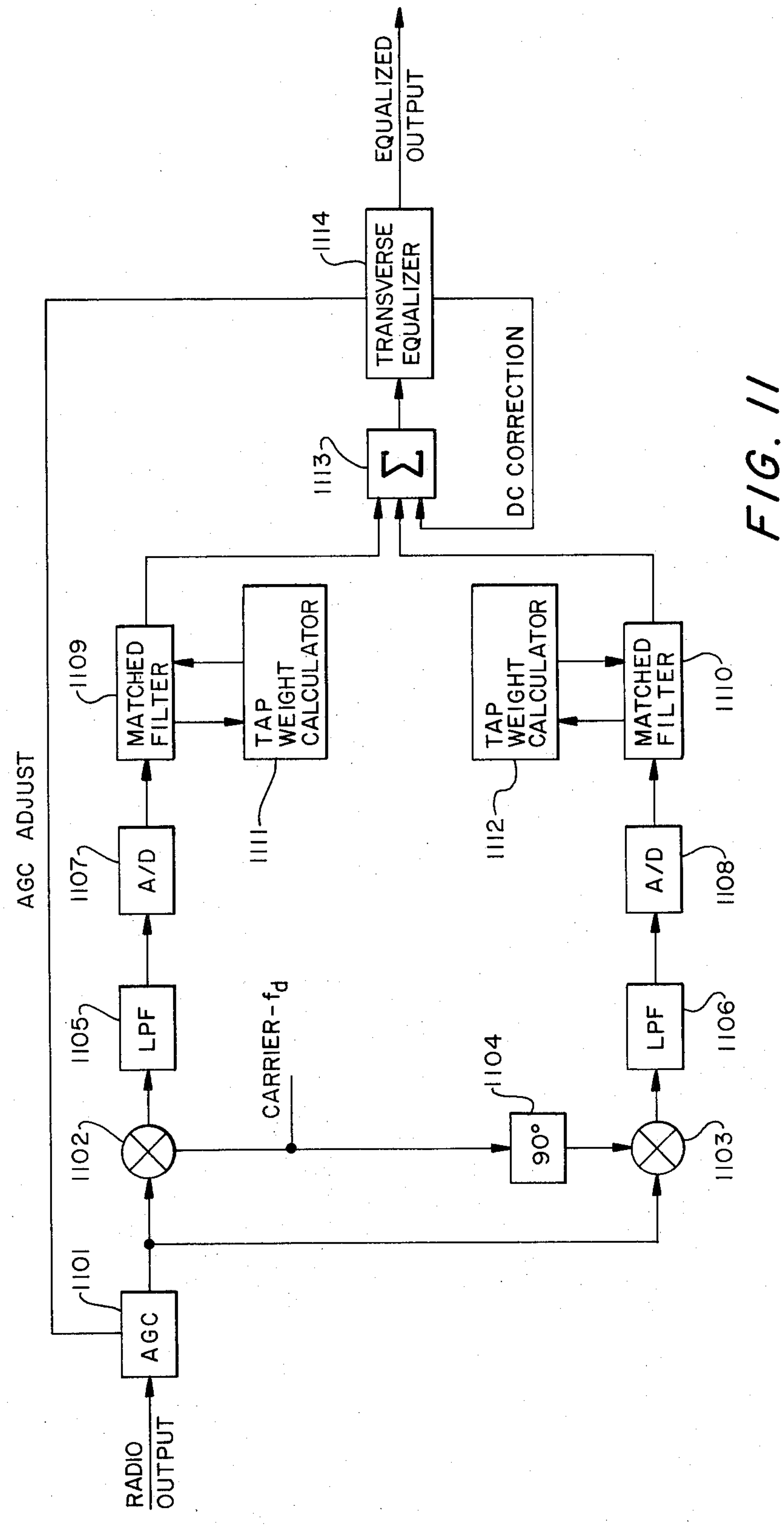
FIG. 11 is a block diagram of the signal processor subsystem of the invention.

Referring now to FIG. 11, there is shown another major subsystem of the ARTEM receiver or demodulator — the signal processor. In operation a passband signal supplied from the SSB radio is applied to an AGC 1101 and is demodulated to baseband by quadrature demodulators 1002 and 1003 - two demodulators being required since the carrier phase may be unknown. After low pass filtering in LPF's 1105 and 1106, the two quadrature signals are sampled at a rate of 4800 samples per second and then digitized in A/D converters 1107 and 1108. The two signals are then passed through their respective matched filters 1109 and 1110, and the matched filter outputs are summed in summer 1113 and the resultant is then passed through a transversal equalizer 1114. The matched filters 1109 and 1110 are updated every 13.1 milliseconds, the information to update the filters being derived from the known PN sequence which is transmitted in the form of the sign bit of the PAM level. The update rate for the transversal equalizer 1114 is much more rapid since the tap weight controllers are updated at the symbol rate of 4800 symbols per second. (To editor, the subscripts 1 are meant to be 1 (small L)).

The tap weight calculators take the unsmoothed or unweighted estimates of the channel impulse response, $h_{l,m}$, and smooth or weight the estimates according to the relation, $$h_1=\sum_{k=1}^{N} w_k h_1,\ N_{-k}.$$

After smoothing the estimates, $h_1$, are outputted to the matched filters. The matched filter tap weights are in fact the smoothed estimates $h_1$ or $m_1 = h_1$. A detail discussion of PN filter tap weight calculator theory and operation is presented infra.

The theory for the signal processor design stems from the study of optimal PAM receivers. These receivers are well known and it has been demonstrated that under an average power constraint, the receiver, W(f), which minimizes the mean square error, $E[(b_k - a_k)^2]$, of a bandlimited channel is $$W_{opt}(f)=\frac{H^*(f)}{\frac{N(f)}{M(f)}+\frac{1}{T}H(f)H^*(f)} \qquad (7\text{-}4)$$

where $H^*(f)$ = is the complex conjugate of $H(f)$ $H(f)$ = is the Fourier transform of the channel and transmission system impulse response.

$N(f)$ = is the noise power spectral density, $M(f)$ = is the transform associated with the discrete message auto-correlation $m_k$ given by $b_k$ = sample values of the received signal $a_k$ = sample values of the transmitted signal $$M(f)=m_o+2\sum_{k=1}^{\infty}[m_k]\cos \pi 2kTf.$$

where $m_o = E\{(a_k a_k)\}$ $m_k = E\{(a_1 a_{1-k})\}$ $k$ is the parameter of indexing $T$ is the reciprocal of the symbol rate.

$E\int\int$ is the expectation operator

Under the additional constraint of zero intersymbol interference, the optimum W(f) is given by $$W_{sym}(f)=\frac{H^*(f)}{N(f)}\sum_{k=-(N-1)}^{(N-1)} c_k e^{-j2\pi kTf}, \qquad (7\text{-}5)$$

where $N$ = is the length of the transmitted data blocks $c_k$ may be regarded as transversal filter tap weights where blocks of length $N$ are transmitted and the $c_k$'s satisfy $$\sum_{k=-(N-1)}^{N-1} c_k\int_{-\infty}^{\infty}\frac{H(f)H^*(f)}{N(f)}e^{j(n-k)2\pi Tf}df$$

$$=\begin{cases}1 \text{ if } n=0\\ 0 \text{ is } n=\pm 1,\ \pm 2,\ \ldots\ \pm(N-1).\end{cases} \qquad (7\text{-}6)$$

If the noise is white, $N(f)$ is constant and if the data samples $a_k$ are uncorrelated, $M(f)$ is a constant. In this case Equations 7–4 and 7–5 become $$W'_{opt}(f)=\frac{K_1 S/NH^*(f)}{1+K_2\frac{S}{N}H(f)H^*(f)} \qquad (7\text{-}7)$$

where $K_1$, $K_2$ are constants derivable from (7–4)

$S/N$ = signal to noise power ratio $$W'_{sym}(f)=\frac{KH^*(f)}{N}\sum_{k=-(N-1)}^{(N-1)} c_k e^{-j\pi kTf} \qquad (7\text{-}8)$$

Inspection of the above equations shows that in both cases the receiver may be modeled as matched filter followed by another transfer function and although it is not immediately apparent, both may be realized by a matched filter followed by a tapped delay line. Note also that $$\lim_{S/N\to 0} W_{opt}(f)\to K_1\frac{S}{N}H^*(f)$$

$$\lim_{S/N\to\infty} W_{opt}(f)\to\frac{K_1}{K_2}\frac{1}{H(f)}$$

Thus a matched filter, $H^*(f)$ is best for low $S/N$ while an inverse filter $1/H(f)$ is best for large $S/N$. Note that the inverse filter may be realized by cascading a matched filter $H^*(f)$ with a filter whose transfer function is $1/H^*(f)H(f)$.

Consequently, ARTEM employs a matched filter in cascade with a transversal filter whose characteristic is given as $T(f)$. Depending upon the explicit configuration of $T(f)$, the receiver characteristic $W(f) = H^*(f)T(f)$ may be made to approximate either $W_{opt}(f)$ or $W_{sym}(f)$.

It remains to demonstrate that the signal processor is functionally equivalent to a matched filter in cascade with a transversal equalizer. Operation of the signal processor may be analyzed with the aid of FIG. 12. The major difference between this implementation and the ideal is that the passband input signal must be demodulated to baseband.

Figure 12:
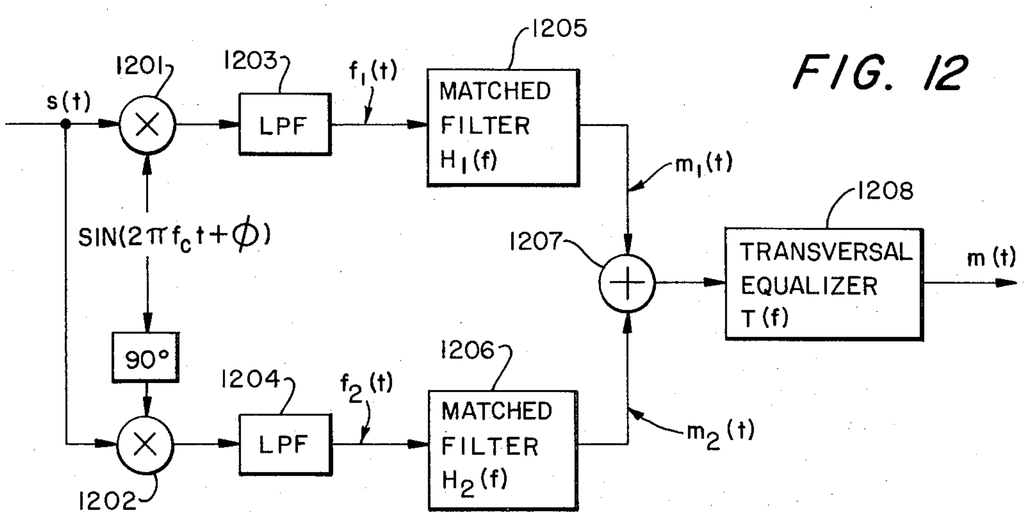
FIG. 12 is a block diagram of a simplified signal processor.

In FIG. 12 a passband signal is applied to quadrature demodulators 1201, and 1202, and resulting signals are low pass filtered through LPF's 1203 and 1204, and then passed through adaptive matched filters 1205 and 1206. The matched filters perform three functions. First, they compensate for any residual carrier phase inaccuracies which occurred during demodulation. Second, they permit the quadrature demodulated signals to be algebraically added in summer 1207. Finally, they linearize the phases of the baseband waveforms, thus simplifying the equalization task of the transversal equalizer. The adaptive transversal equalizer 1208 removes amplitude pertubations caused by the $H(f)$ multipath and radio filter characteristics, thereby reducing the intersymbol interference. In baseband, therefore, the signal processor is equivalent to an adaptive matched filter followed by an adaptive transversal equalizer, this baseband representation being given in FIG. 13.

Since the received passband signal may be described as $$s(t) = g(t)\cos 2\pi f_c t + \hat{g}(t)\sin 2\pi f_c t \tag{7-1}$$

where $g(t)$ is the baseband signal the receiver attempts to recover $f_c$ is the carrier frequency of the received signal $s(t)$ $t$ represents time $\hat{g}$(t) is the Hilbert transform of $g(t)$ This signal is multiplied by quadrature components of the receiver reference carrier yielding $$f_1(t) = s(t)\sin(2\pi f_c t + \phi) = g(t)\sin\phi + \hat{g}(t)\cos\phi$$

$$f_2(t) = s(t)\cos(2\pi f_c t + \phi) = g(t)\cos\phi - \hat{g}(t)\sin\phi.$$

where $\phi$ is the phase offset of the receiver carrier with respect to the carrier cos $2\pi f_c t$ of $s(t)$.

Denoting the convolution operation by * the two matched filter outputs are then given by $$m_1(t) = f_1(t) * f_1(-t)$$
$$= g(t) * g(-t)\sin^2\phi + g(t) * \hat{g}(-t)\cos^2\phi$$
$$+ g(t) * g(-t)(\sin 2\phi 12) + g(-t) * g(t)(\sin 2\phi 12)$$
$$m_2(t) = g(t) * g(-t)\sin^2\phi + \hat{g}(t) * \hat{g}(-t)\cos^2\phi$$
$$- g(t) * \hat{g}(-t)(\sin 2\phi 12) - g(-t) * \hat{g}(t)(\sin 2\phi /2)$$

After summing the matched filter outputs the resultant is $$m(t) = m_1(t) + m_2(t) = g(t) * g(-t) + \hat{g}(t) * \hat{g}(-t)$$

If $g(t)$ were set equal to zero the input would be double sideband AM (DSB). Additionally, if $\hat{g}(t)$ were the harmonic conjugate of $g(t)$ the input signal would be signal sideband AM (SSB).

Since DSB and SSB are the limiting cases of VSB, a proof that, indeed $m(t) - K[g(t) * g(-t)]$ may be made by demonstrating that the relation is valid in the limiting cases of DSB and SSB. In fact VSB may be regarded as a combination of DSB and SSB. Near the carrier the VSB spectrum is similar to DSB, while away from the carrier the VSB spectrum appears to be SSB.

Suppose the input to the receiver is DSB. Then $\hat{g}(t) = 0$, and $s(t) = g(t)\cos 2\pi f_c t$, where $g(t)$ is the baseband representation of the passband signal $s(t)$ $s(t)$ is a double sideband signal centered about the carrier $f_c$.

Thus $$m(t) = g(t) * g(-t)$$

is the matched filter response to $g(t)$.

Next assume $s(t)$ is SSB. In this case $$\hat{g}(t) = H[g(t)]$$

is the Hilbert transform of $g(t)$ where the SSB input signal is $$s(t) = g(t)\cos 2\pi f_c t + \hat{g}(t)\sin 2\pi f_c t.$$

It remains to prove that $$g(t) * g(-t) + \hat{g}(t) * \hat{g}(-t) = K[g(t) * g(-t)]$$

where K is a constant.

If $$g(t) <=> \hat{g}(t) \tag{7-9}$$

are a Hilbert transform pair then $$\hat{g}(-t) <=> -\hat{g}(-t). \tag{7-10}$$

Additionally, for any two Hilbert transform pairs $(\hat{a}, a)$ and $(\hat{b}, b)$ $$\hat{a} * * \hat{b} = -a * b. \tag{7-11}$$

Using the relations Equations 7–9, 7–10 and 7–11

$$\hat{g}(t) * \hat{g}(-t) = \{-[g(t) * (-g(t))]\}$$
$$= g(t) * g(-t)$$

and $$m(t) = g(t) * g(-t) + g(t) * g(-t)$$
$$= 2[g(t) * g(-t)].$$

Thus, the quadrature carrier-matched filter demodulator may be regarded as a simple matched filter operating upon a baseband input.

Figure 13:
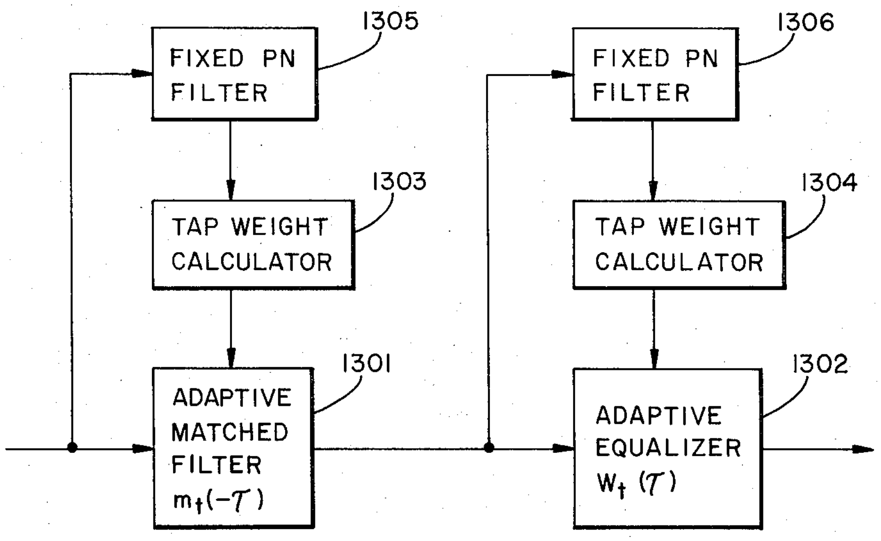
FIG. 13 is a block diagram of a baseband model of the signal processor.

On the basis of the proceeding discussion the signal processing subsystem may be modeled in baseband and regarded as an adaptive matched filter and adaptive transversal filter in cascade as shown in FIG. 13. In order to simplify the required computer programming, this baseband model was employed in the simulations of signal processor operations upon multipath inputs.

As mentioned above, FIG. 13 is a baseband equivalent representation of the system of FIG. 12. That is, the system of FIG. 12 conceptually processes the signal $s(t)$ (Equation 7–1) to yield the resultant $m(t)$ while the system of FIG. 13 conceptually processes the signal $g(t)$. (Equation 7–1) to yield the same signal $m(t)$. The fixed PN filter 1305, tap weight calculator 1303 and adaptive matched filter 1301 are component parts of the matched filter 1205 and 1206 illustrated in FIG. 12, and are shown in this configuration for the subsequent purpose of explaining system operation. In this representation, only one channel — either the 1201/1203/1205 or 1202/1204/1206 sides of FIG. 12 is required for system analysis.

The fixed PN filter 1306 tap weight calculator 1304 and adaptive equalizer 1302 of FIG. 13 are a baseband representation of the transversal equalizer 1208 of FIG. 12 and are shown in this configuration for the purpose of subsequent analysis.

Explanation of the operation of the fixed PN filters, tap weight calculators, adaptive matched filter and adaptive equalizer is deferred until PN sequence properties are discussed. Detailed operation of above elements is presented infra.

The definition of a PN sequence is as follows (1): $\{a_k\}$ is a PN sequence if and only if it is a binary sequence which satisfies a linear recurrence equation.

$$a_k = \sum_{i=1}^{N} c_i a_{k-i} \text{ (modulo 2)}$$

where $\int a_k \int$ is a sequence of zeros and ones $\int c_i \int$ is a sequence of constants equal to zero or one, and has period $p=2^N-1$. The number N is referred to as the degree of the sequence $\int a_k \int$. PN sequences may be shown to satisfy three randomness postulates, (Golomb, S.W. Shift Register Sequences, Holden-Daij San Francisco, 1967), which are:

Property 1

In any PN sequence of length $2^N-1$, there are $2^{N-1}$ ones and $2^{N-1}-1$ zeros.

Property 2

In a PN sequence of length $2^N-1$, every possible sequence of N consecutive terms, except all zeros, occurs exactly once.

Property 3

Let $b_k$ be a sequence derived from the PN sequence $\int a_k \int$ by means of the relation $b_k = 1-2a_k$. Then the autocorrelation of $b_k$ is $$c_l=\frac{1}{N}\sum_{k=1}^{N} b_k b_{k+l} = \begin{cases} 1 \text{ if } l=0 \\ -\frac{1}{N} \text{ if } 0<l<N. \end{cases}$$

where $\int a_k \int$ is a PN sequence of zeros and ones. The final property is especially important since the autocorrelation of a PN sequence closely approximates a series of dirac delta functions. Note that as N increases the quality of the approximation improves. A typical 6-stage PRG (pseudo random generator) which generates a PN sequence of length 63 is shown in FIG. 14.

Figure 14:
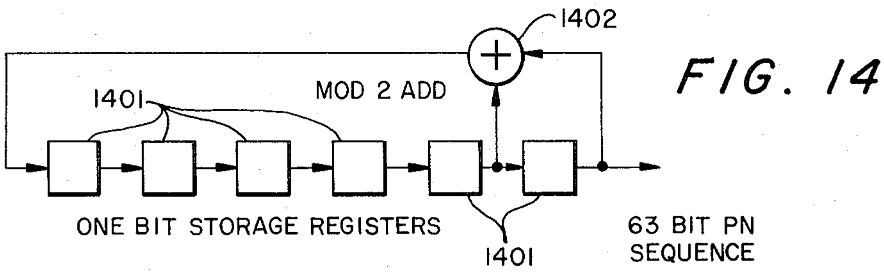
FIG. 14 is a block diagram of a PN sequence generator.

Referring to FIG. 14 the PN Sequence Generator is comprised of a 6 bit serial shift register of 6 cells 1401 (which may be flip-flops or other suitable storage devices). The taps of the register are coupled to a modulo (2) adder 1402 in accordance with the following relation $$1 \oplus X^6 \oplus X^7$$

where the symbol $\oplus$ stands for modulo (2) addition and $x$ is a variable which is employed to signify a shift register feedback tap position.

Each stage or cell of the register stores one binary digit which is serially transferred from left to right at clock produce to prouce 63 bit PN sequences.

The purpose of the following is to demonstrate that the channel impulse response may be obtained in real-time from the received waveform without knowledge of the random data contained in the waveform.

Consider a general system in which the input signal $s(t)$ is passed through a network $h(t)$ resulting in an output $r(t)$. Let $s(t)$ be composed of the 4 level PAM signal $$s(t)=\sum_{k=\infty}^{\infty} a_k\delta(t-kT) \quad (7\text{-}12)$$

where $\alpha$ is the Dirac delta function and where $a_k = \int 1, 1/3, -1/3, -1 \int$. The PAM levels $a_k$ are a function of a zero-mean data sequence $d_k$ and a PN sequence $\int P_k \int$. The PN sequence is uncorrelated with the data and has a mean value $-1/(2^n-1)$ where $2^n-1$ is the length of sequency. Suppose the $a_k$ are obtained from the data and PN sequence as follows:

| PAM Level $a_k$ | PN $p_k$ | DATA $d_k$ |
|---|---|---|
| 1 | 1 | 1 |
| ⅓ | 1 | −1 |
| −⅓ | −1 | 1 |
| −1 | −1 | −1 |

It is easily verified that $$a_k = (2p_k + d_k)/3$$

Thus Equation 7-12 may be rewritten as $$s(t) = p(t) + d(t) \quad (7\text{-}13)$$

where $$p(t)=\sum_{k=-\infty}^{\infty} \frac{2}{3} p_k\delta(t-kT), \quad (7\text{-}14)$$

$$d(t)=\sum_{k=-\infty}^{\infty} \frac{1}{3} d_k\delta(t-kT), \quad (7\text{-}15)$$

where
$t$ is the variable representing time
$k$ is the index of summation
$T$ is the reciprocal of the symbol rate
and $p_l = p_k$ if $_l = k + m(2^n=1)$, $m$ integer.

The unknown system output $r(t)$ is given by $$r(t) = s(t) * h(t) = (p(t) + d(t)) * h(t). \quad (7\text{-}16)$$

where
$s(t)$ is the input $(p(t) + d(t))$ to the system $h(t)$
$r(t)$ is the output of the unknown system $h(t)$ to input $r(t)$
$p(t)$ is defined by equation 7-14
$d(t)$ is defined by equation 7-15
$h(t)$ is the impulse response (unknown) of the system
* denotes the convalution operation.

Let $g(t)$ be the function obtained by correlating the system output $r(t)$ with the known signal $p(t)$ or $$g(t) = r(t) * p(t), \quad (7\text{-}17)$$

where * denotes the correlation operation.

Equations 7-17 and 7-16 may be combined to yield $$g(t)=p(t) * \{[p(t)+d(t)] * h(t)\} \quad (7\text{-}18)$$

which upon expansion becomes $$g(t)=\int_{-\infty}^{\infty} p(y)\int_{-\infty}^{\infty} [p(y+t-x)+d(y+t-x)]h(x)dxdy. \quad (7\text{-}19)$$

where
$y$ is a dummy variable of integration
$x$ is a dummy variable of integration Interchanging the order of integration and integrating on $y$ gives $$g(t)=\int_{-\infty}^{\infty}[R_{pp}(t-x)+R_{dp}(t-x)]h(x)dx, \qquad (7\text{-}20)$$

where the correlation functions are $$R_{pp}(t-x)=\int_{-\infty}^{\infty}p(y)p(y+t-x)dy,$$

$$R_{dp}(t-x)=\int_{-\infty}^{\infty}p(y)d(y+t-x)dy.$$

Since the PN sequence and data are zero mean and independent $$R_{dp}(t-x)=0$$

Moreover as the $p_k$ constitutes a PN sequence (Randomness Property 3)

$$R_{pp}(t-x)=K\sum_{k=-\infty}^{\infty}\sigma(t-x-kT)$$

where T is the period of the sequence. Assume $T\approx\infty$, in which case $$R_{pp}(t-x)=K\,\Sigma\,(t-x),$$

where $K$ is a constant proportional to the length of the PN sequence.

Now Equation 7–20 becomes $$g(t)=\int_{-\infty}^{\infty}K\sigma(t-x)h(x)dx=Kh(t)$$

and $g(t)$ is simply a constant times the impulse response $h(t)$. Thus it has been shown that cross-correlation of the incoming signal and the known PN sequence yields the overall channel impulse response $h(t)$.

The correlation operation may be related to the familiar convolution operation (as performed by transversal filters) as follows:

$$x(t)\circledast y(t)=\int_{-\infty}^{\infty}x(\sigma)y(t+\sigma)d\sigma.$$

where $(t)$ is an arbitrary integrable function of the variable $xt$ $y(t)$ is an arbitrary integrable function of the variable $t$ $\Sigma$ is the dummy variable of integration Let $\Sigma=-p$ then $$x(t)\circledast y(t)=\int_{-\infty}^{\infty}x(-p)y(t-p)dp$$
$$=x(-t)*y(t).$$

where $p$ is a dummy variable equal to $-p$ $t$ is a dummy variable.

Consequently the cross-correlation of $x(t)$ and $y(t)$ is equal to the convolution of $y(t)$ and the function obtained by reversing $x(t)$ in time, namely $x(-t)$. If $x(t)$ and $y(t)$ are identical, that is $x(t)=y(t)=p(t)$, then the autocorrelation of $p(t)$ is the function which may be obtained by passing $p(t)$ through a matched filter. Since the transmitted signal may be represented as $d(t)+p(t)$ the PN Filter impulse response $p(-t)$ is matched to the PN sequence. It is now evident that the PN filters employed in the receiver are a special type of matched filter. Indeed, all constant and adaptive receiver filters may be regarded as particular forms of transversal filters.

Figure 15:
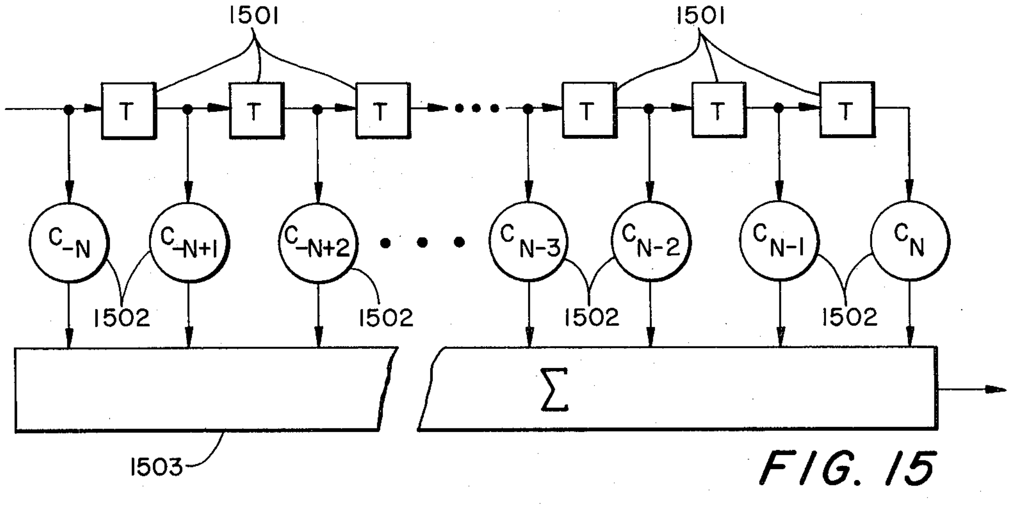
FIG. 15 is a block diagram of an adaptive transversal filter for use in the invention.
Figure 16:
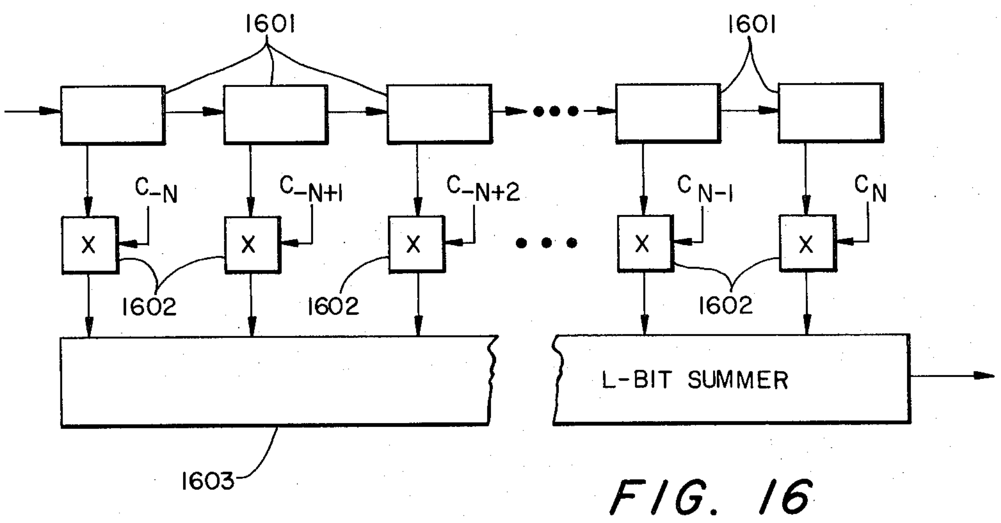
FIG. 16 is a block diagram of an adaptive digital transversal filter.

Referring now to FIG. 15 (See ch. 6 of above referenced Lucky Book), a transversal filter consists of a delay line comprised of delay elements 1501 tapped at T second intervals. Each tap is connected to a summer 1503 by means of variable gain amplifiers or multipliers 1502. In practice, transversal filters are usually implemented digitally as shown in FIG. 16. The filter is composed of 2N+1 storage resisters 1601 (which may be flip-flop or other suitable storage device), 2N+1 multipliers 1602 and a summer 1603. Data is serially shifted from left to right at T second intervals. If the tap multipliers are $$C_{-N}\quad C_{-N+1},\ldots,C_{-1},C_0,C_1,\ldots,C_N$$

the impulse response of the filter is $$i(t)=\sum_{k=-N}^{N}C_k\sigma(t-kT)$$

where $C_k$ is the tap multiplier $t$ represents the variable time $k$ is the index of summation $T$ is the reciprocal of the symbol rate and its frequency response is $$I(f)=\sum_{k=-N}^{N}C_ke-j2\pi kfT$$

where $k$ is the index of summation $f$ represents the variable frequency.

Note that $I(f)$ is a complex Fourier series in the frequency domain. The filter response to an arbitrary input $l(t)$ is given by $$r(t)=l(t)*i(t)=\sum_{k=-N}^{N}C_kl(t-kT).$$

In terms of the discrete input sample values $x_k$, the output of the filter may be expressed as $$y_l=\sum_{k=-N}^{N}C_kx_{l-k}.$$

Figure 17:
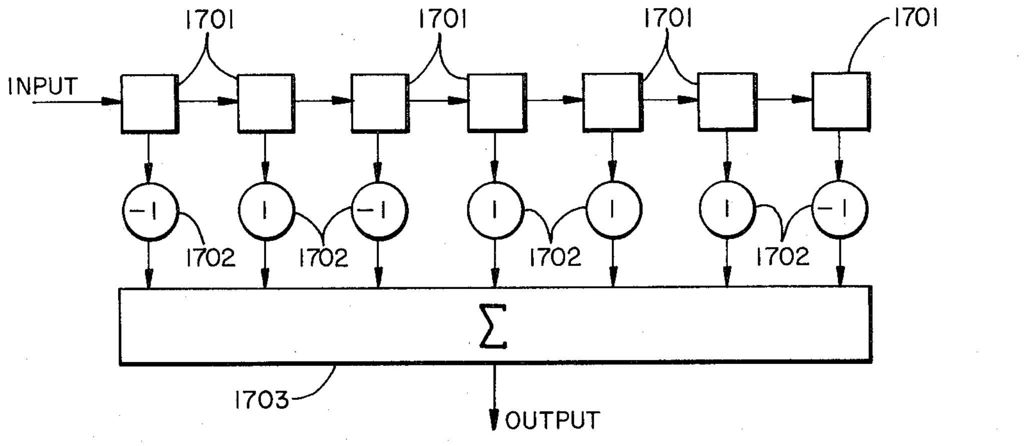
FIG. 17 is a simplified block diagram of PN filter for use in the invention.

Transversal filter operation may be explained in terms of the PN filters previously discussed. This example is given in FIG. 17, where for simplicity, it is assumed that input sample values equal the PN sequence values. Filter operation is accomplished by serially transferring the input data samples through the one bit storage registers 1701. After each shift the contents of the respective storage cells are multiplied by the appropriate tap weights in multiplier 1702 which have been set equal to the sample values of the known PN sequence. The filter output is the sum of the tap weights sample values. Specifically, if $\{p_k\}$ are the filter tap weights and $\{a_k\}$ are the input sample values, the output sequence $\{r_k\}$ is given by $$r_l = \sum_{k=-N}^{N} p_k a_{l-k}$$

where $l$ is an indexing variable $k$ is the index of summation

It is readily seen that the filter does perform the desired correlation operation.

The operation of the PN Filters may differ from the simple example above in two ways. First, the input sample values may be multilevel and consequently the storage registers may store more than one bit, the typical number of bits being in the range of 6 to 10. Secondly, the input sample values may be a function of both the PN sequence and data as well as additive noise. The effect of data is to create an error or data bias in the receiver's estimate of the channel impulse response $h(t)$. This data bias may be removed by an averaging process upon the data. Averaging over long data sequences is accomplished by:

1. Increasing the length of the PN sequence in order to average over more data bits.
2. Directly averaging over multiple impulse responses $h(t)$ since each estimate of $h(t)$ is biased by a different data sequence.

The best method is a combination of both 1 and 2. Increasing the PN sequence length increases the time interval between successive estimates of $h(t)$. Moreover, if $h(t)$ is estimated over too long a period, the actual channel response may change significantly during the estimation period. If $h_{l,k}$ is defined as the $k$-th estimate of the $l$-th sample value of $h(t)$, the averaging process may be written as $$h_l = \sum_{k=1}^{N} W_k h_{l,\ N-k},$$

where the averaging is over $N$ estimates and $W_k$ are the weighting factors employed. Candidate sets of $W_k$ are:

a. $W_k = 1/N, K = 1, 2, \ldots, N$ b. $W_k = (N+1-k)/N, k - 1, 2, \ldots, N$ c. $W_k = 1/(2^{k-1}), k = 1, 2, 3, \ldots$ If a PN sequence of length 63 is employed when the modulation is 4-level PAM, averaging is over four estimates (N=4) if constant $W_k$ are used as weighting factors.

Operation of the matched filters is essentially the same as operation of the PN Filters, the major distinction lying in the tap weights. While the PN Filter tap weights are constant in time and only assume the values +1 or −1, the matched filter taps are varied in time to adapt to the time varying channel impulse response. In the preferred embodiment matched filter tap weights contain 6 to 10 bits.

The matched filter taps are set as follows: Let $h_{l,k}$ be the $k$-th estimate of the $l$-th sample value of $h(t)$; then the $(N-l)$-th tap setting is simply $h_{l,k}$. Each time a new estimate becomes available, the respective digital tap weight is changed. Note that this estimate may be computed each time the PN sequence is repeated. For example, use of a 63 bit PN sequence at a symbol rate of 4,800 symbols/second, means that the matched filter taps are updated every 63/4,800 ≈ 13.1 ms. Since each new tap weight setting is a function of four or more estimates, changes in the actual weights are not drastic.

Figure 18:
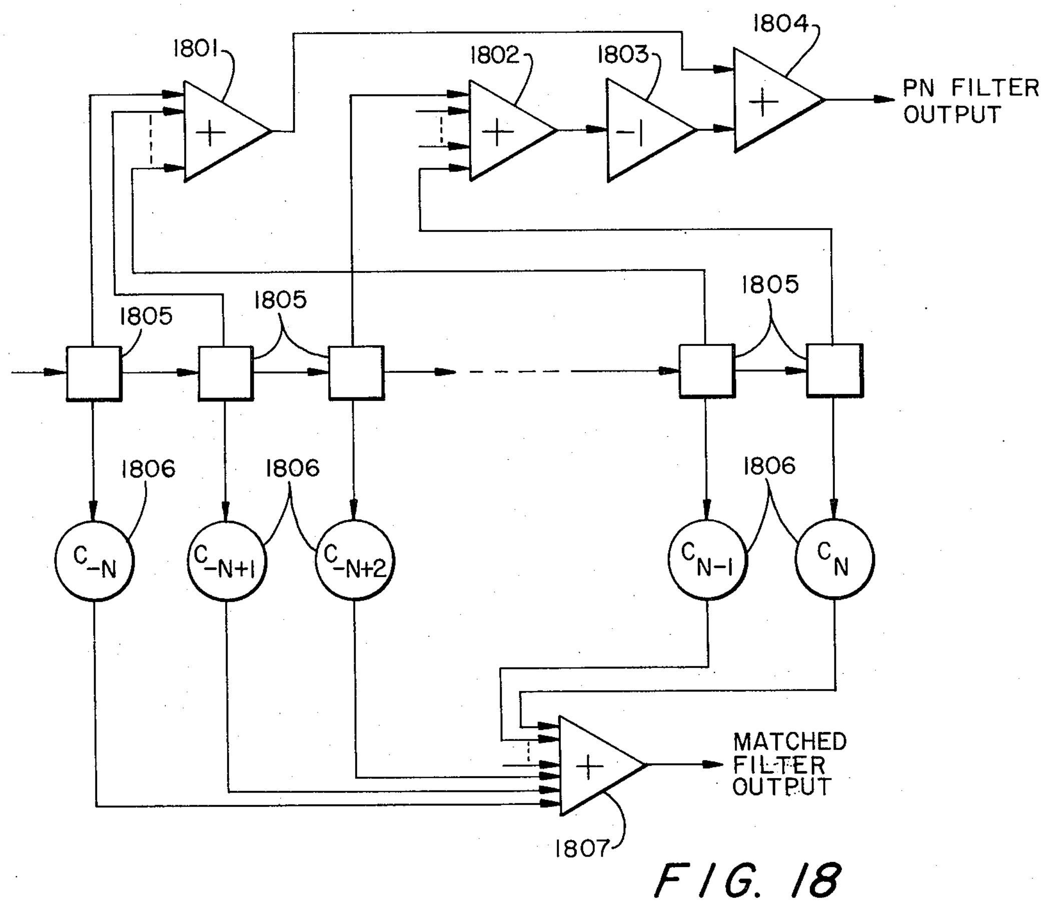
FIG. 18 is a block schematic diagram of a combined PN-matched filter for use in the invention.

It can be seen that there is a dramatic similarity between the PN filters and adaptive matched filters. As a consequence these filters may share a common set of storage registers as shown in FIG. 18. This joint use of memory results in a considerable reduction in hardware when compared to the case of separate implementation.

Referring to FIG. 18 storage registers 1805 are coupled at each stage to multipliers 1806, which are all in turn coupled to summer 1807 which adds the sum of the individual outputs of the multipliers to produce the matched filter output.

The units 1801, 1802 and 1804 are multi input summers, identical in operation to the summer 1807. Unit 1803 is an inverter, that is its output is identical to its input except that the sign of the output is the opposite of the sign of the input.

The basic operation of the automatic equalizer is essentially the same as that of the matched filter, the major difference being in the manner in which the tap weight settings are derived from successive estimates of the matched filter-demodulator output. As in the case of the PN-matched filter the automatic equalizer and corresponding PN filter may share a common memory or set of storage registers.

Indeed, a convenient classification of transversal equalizers may be made on the basis of the tap settings. If the taps are initially set and thereafter held constant, the equalizer is classified as an automatic equalizer in contrast to adaptive equalizer whose taps are continually updated. It is obvious that equalization of the time varying HF channel requires the use of adaptive equalizers. The criteria employed in setting the taps can be formulated as a set of $2N+1$ equations. These equations then are solved directly, by matrix inversion for example, or indirectly by a recursive procedure. The latter technique is usually employed for several reasons:

A solution by matrix inversion is complex and requires the use of a small computer.

The exact channel impulse response is generally not available and consequently equalization must be performed while specific probe pulses or actual data is being transmitted.

It may be shown that a necessary condition for a channel whose transfer function is $H(f)$ to be perfectly equalized is that $$H(f) \neq 0, |f| \leq 1/2T. \qquad (7\text{-}21)$$

This equation is extremely important since it is easily shown that in the case of dual, equal multipaths this condition may be violated in the baseband channel upon which equalization is attempted.

Two important parameters pertaining to recursive adjustment algorithms are D, the minimum peak distortion attainable, and $T_c$, the time required for the tap weight settings to converge to their final state. In terms of the impulse response samples $\int h(dT)\int$, D may be expressed as $$D=\frac{1}{h(0)}\sum_{k}\int h(kT)\int-1$$

If D is not sufficiently small, an adequate eye opening may not occur and the PAM levels cannot be resolved while if $T_c$ is too long the equalizer may be too slow to "track" HF channel changes. The two parameters are related as $T_c$ increases if D decreases and a compromise between the two is often made. Note that if the taps are calculated directly rather than being recursively updated, $T_c$ is simply the time required for the calculation.

In order to relate the proceeding discussion of transversal filters to hardware requirements, filter sizes ofthe preferred embodiment are as follows:

Matched filter length — 63 stages. This is equivalent to 63 symbols or 13.1 milliseconds at 4,800 symbols/second.

PN filter length — 63 stages.

Adaptive Equalizer length —65 stages.

An important feature of the signal processor is that neither carrier phase nor baud timing phase is required. Carrier phase independence is a direct result of matched filtering in the two legs of the quadrature demodulator as demonstrated in FIG. 7–17. The matched filters also serve to alleviate the requirement for baud phase timing recovery.

While coarse AGC action occurs in the radio receiver, fine and coarse AGC regulation is performed in the ARTEM signal processor. Control signals for the course analog AGC are provided by the PN Filter which outputs the matched filter response. Additional precise, digital AGC action is performed by the adaptive equalizer.

Summary Signal Processor Operation

Based upon the preceeding discussion, operation of the signal processor may be summarized. The input passband signal is first demodulated to base-band by quadrature reference oscillators whose frequency equals the apparent carrier of the received signal. After low pass filtering the baseband signals are passed through matched filters and added. Finally, the composite baseband signal is passed through a transversal equalizer which reduces intersymbol interference or mean square error. The matched filter tap weight values are supplied by corresponding PN filter outputs. A PN filter also supplies the necessary impulse response to the subsystem which calculates the transversal equalizer tap weights. All adaptive filters are updated each time the transmitted PN sequence cycles, typically every 13.1 milliseconds.

Timing Subsystem

The timing subsystem operates upon raw signals or information provided by the signal processor and supplies timing signals, in the form of carrier and sampling frequencies, to all other subsystems. As previously discussed, neither carrier phase nor sample timing phase are necessary due to the action of the receiver matched filters. Since the problems associated with carrier frequency recovery and baud timing (or sample frequency) recovery are significantly different, they will be discussed separately.

The complexity of the carrier recovery problem when VSB is transmitted over the HF link is due primarily to the presence of time varying doppler shifts and significant static frequency offsets. The transfer function of the linear, time-variant channel is characterized by its impulse response, $h(T,t)$. The time-variance of this response is caused primarily by the HF reflecting larger parameter changes, by radial motion between transmitter and receiver, by SSB receiver tuning error, and finally by the frequency of ARTEM's VSB carrier demodulator. If $h_o(T)$ is defined to be the impulse response of the ARTEM system when placed back-to-back and using common carrier oscillators, then the actual impulse response when radiating over an HF link may be expressed as:

$$h(T,t)=e^{j[W_d(t)+\Delta W_T(t)-\Delta W_o(t)]t}\sum_{i=1}^{N}G_i(t)h_0(T)e^{jW_i(t)t} \qquad (7\text{–}22)$$

where $N$ = the number of propagation paths to the receiver $G_i(t)$ = the gain of the $i^{th}$ path $h_O(T)$ = the back-to-back impulse response with common carrier oscillators $W_i(t)$ = the doppler shift of the $i^{th}$ path $W_d(t)$ = the doppler shift common to all paths due to radial motion $W_T(t)$ = the frequency error due to receiver mistuning $W_c(t)$ = the frequency difference between the modulator's VSB carrier frequency and the demodulator's carrier frequency The assumption is made that $h_O(T)$ is a narrowband process so that doppler shifts negligibly warp its time scale, and that the receiver's IF filter bandwidth is somewhat wider than the transmitted spectrum.

Observation of Equation 7–22 reveals that there is no selection of $\Delta W_c(t)$ which will make $h(T,t)$ time-invariant. However, it is clear that we can reduce the time variance of $h(T,t)$ by choosing $\Delta W_c(t)$ such that:

$$\Delta W_o(t)=W_d(t)+\Delta W_T(t)+\sum_{i=1}^{N}\frac{G_i(t)W_i(t)}{\sum_{i-1}^{N}G_i(t)} \qquad (7\text{–}23)$$

Equation 7–23 expresses the goal for the real-time selection of the demodulator's carrier frequency which is the adjustment of the demodulator's carrier frequency to compensate for the frequency errors introduced by radial motion doppler shift, receiver tuning error, and the gain-weighted average of the multipath doppler shifts.

Synchronization techniques are divided into two broad categories; those which transmit separate energy for sync purposes and those which exploit special properties of the data signal itself. In the ARTEM technique, a fraction of the transmitted power is already devoted to a channel measuring pseudo-random code. Since the applied signal is vestigial sideband or partial double-sideband, then a "Costas" or squaring type of tracking phase-lock loop may be used for carrier recovery, although the system previously described supra is preferred for this embodiment. The Costas approach however has a number of attractive features. First, it can approach the carrier recovery goal (Equation 7–23) since this technique tracks the average, weighted phase-rate of the double-sideband signals flanking the suppressed carrier. Second, if it is a second order phase-lock loop, then the loop bandwidth can be made to diminish as a selective fade move through the DSB-SC spectral region, allowing the loop to flywheel with good frequency memory. Furthermore, the pseudorandom sounding signal guarantees adequate DSB-SC signal for the loop, independent of data.

Another technique is to send a pair of pilot tones flanking the data spectrum, which have a known relationship to the carrier frequency. At the demodulator these forms may be frequency tracked and their individual SNR (Signal to Noise Ratio) averaged, synthesized carrier frequency used. This approach provides a diversity protection for demodulation. To its detriment, however, this approach is sensitive to adjacent channel interference and requires an additional fraction of transmitter power.

A third approach is a hybrid of the above two techniques. A single band edge tone and a Costas loop operating on the partial DSB-SC (Double Sideband-Suppressed Carrier) signal provides two independent estimates of carrier frequency. The SNR weighted average value of phase-rate is then used to synthesize the demodulator's local carrier frequency.

It should be clear from the preceding discussion that the task of a carrier recovery subsystem for ARTEM is well defined and practical ways exist in the prior art to form a reasonable estimate of the optimum carrier demodulator frequency.

Use of an additional pilot signal to provide baud timing

Baud timing is performed by conventional techniques. The derivation of baud timing from the zero crossings of the received waveform is a proven technique employed in VSB wireline modems. (W.R. Bennet and J.R. Davey, *Data Transmission*, McGraw-Hill New York, 1965 Chapter 14). Its main advantage is simplicity since no additional pilot tones need be added to the basic VSB signal and the receiver timing circuitry is a simple zero crossing detector and phase-lock loop. In addition, transmission of a PN sequence simultaneously with the data guarantees R/2 zero crossings per second if R is the symbol rate. With this technique, numerous signal processor waveforms are candidates for input to a zero crossing detector, for example:

a. The output of the sine or cosine mixers after low pass filtering.

b. The outputs of PN filters which supply input to matched filters.

c. The output of matched filters after summing.

d. The output of PN filter which supplies input to the equalizer.

e. The equalizer output.

Data Detection Subsystem

In its simplest form the data detector is composed of an M to 4 level converter where M is the number of quantization levels at the equalizer output. Typically M may range from $2^6 = 64$ to $2^{10} = 1048$. Since all AGC or amplitude scaling is performed in the signal processor this mapping is fixed. Additional functions of this subsystem are those of error detection, error correction and sequential decoding if error control encoding is employed at the transmitter. A distinction is made between error detection-correction and error control decoding since the system possesses an inherent error detection and correction capability even if error control coding is not employed. This capability is a consequence of transmitting known PN sequence as the PAM sign bit. For example, consider the four-level encoding shown in Table III. By inspection, eight of the twelve possible error conditions may be detected by comparing the detected PN sign bit with the correct PN bit which is available at the receiver. In order to illustrate the inherent error-correction capability of the system suppose a PN error was detected and the received level was $-\frac{1}{3}$. The possible errors producing this condition are $E_2$ and $E_5$. It may be shown that $$P(E_5) = K\{Q(x) - Q(2x)\},$$

$$P(E_2) = K\{Q(2x) - Q(3x)\}$$

where $$Q(x) = \frac{1}{\sqrt{2\pi}} \int_x^\infty e^{-t^2/2}\, dt$$

and $$x = (1/5)\,(S/N)^{1/2}$$

TABLE III

| PAM level | PN bit | Data bit | Error conditions E1 | E2 | E3 | E4 | E5 | E6 | E7 | E8 | E9 | E10 | E11 | E12 |
|---|---|---|---|---|---|---|---|---|---|---|---|---|---|---|
| 1 | 1 | 1 | — | — | — | | | | ↑ | | | ↑ | | ↑ |
| ⅓ | 1 | −1 | \| | \| | ↓ | — | — | | \| | ↑ | | \| | ↑ | — |
| −⅓ | −1 | 1 | \| | ↓ | | \| | ↓ | — | \| | \| | ↑ | — | — | |
| −1 | −1 | −1 | ↓ | | | ↓ | | ↓ | — | — | — | | | |
| | | | * | * | | * | * | | * | * | | * | * | |

Detectable errors

The importance of the above probabilities is that, given $E_5$ or $E_2$ occurrence, the probability of $E_5$ is usually much greater than the probability of $E_2$. If the variable R is defined by $$R = P(E_5)/P(E_2)$$

then R as a function of $P(E_2)$ is as follows:

| $P(E_2)$ | R |
|---|---|
| $2\times10^{-1}$ | 1.7 |
| $1.6\times10^{-1}$ | 6.5 |
| $6\times10^{-2}$ | 60.0 |
| $2\times10^{-2}$ | 660.0 |

Thus, if an error condition leading to the output level of $-\frac{1}{3}$ is detected the output data bit is set equal to −1 as the correct state was $+\frac{1}{3}$ with high probability.

The function of error correction decoding is performed in the Data Detector if system operation at the reduced data rate of 2,400 b/s is desired. 2,400 b/s operation is achieved through the use of a rate ½ code at a signalling rate of 4,800 symbols/second.

It may be noted that if partial response signalling in contrast to full response signalling is employed in ARTEM then well known techniques which exploit the inherent redundancy in partial response may be employed for additional error detection and correction capability.

Having shown and described a preferred embodiment of the invention, those skilled in the art will realize that many variations and modifications can be made to produce the described invention and still be within the spirit and scope of the claimed invention.

What is claimed is:

1. An ARTEM system employing multilevel pulse amplitude modulation vestigial side band (PAM-VSB) modulation and continuous real-time automatic channel measurement and equalization of time variants of propagation characteristics of the channel comprising:

a. modulation means for providing at least eight levels PAM-VSB modulation;

b. pseudo-noise (PN) sequence generator means coupled to said modulation means said PN generator for generating PN signal sequences of predetermined length;

c. transmitter means, coupled to said modulation means, for transmitting modulated signals;

d. receiver means responsive to said transmitter means for receiving the transmitted signals, said receiver means further comprising:

α. signal processor means for processing the received modulated signal, said signal processor means further comprising quadrature demodulator means for demodulating the received signal into in-phase and quadrature demodulated signal components, adaptive matched filter means coupled to said quadrature demodulator means and responsive to the PN signal sequence for compensating for residual carrier phase inaccuracies, summing means coupled to said adaptive matched filter means, for summing the in-phase and quadrature signal components, and adaptive transversal equalizer means coupled to said summing means having adjustable tap gains for controllably eliminating intersymbol interference;

β. phase correction and carrier recovery means for correcting phase and recovering the received signal, said phase correction and carrier recovery means coupled to said signal processor means; and, γ. data detect and error correction means for converting a predetermined number of quantization levels to at least eight, and detecting and correcting the coding erros.

2. An ARTEM system as recited in claim 1 wherein said adaptive matched filters each have a filter length of 63 stages.

3. An ARTEM system as recited in claim 2 wherein said adaptive transversal equalizer has a length of 65 stages.

4. An ARTEM system as recited in claim 3 wherein the matched filter includes a predetermined number of taps which are varied in time to adapt to a time varying channel impulse response.

5. An ARTEM system as recited in claim 4 wherein the predetermined number of taps is 63 and said taps are updated at substantially every 13.1 ms.

6. An ARTEM system as recited in claim 3 wherein said adaptive transversal equalizer comprises a delay line tapped at T second intervals each tap being coupled to a multiplier, each multiplier being in turn coupled to said summing means.

7. An ARTEM system as recited in claim 6 wherein said delay line comprises a digital serial shift register.

8. An ARTEM system as recited in claim 1 wherein said phase correction and carrier recovery means comprise frequency tracking means for tracking a frequency which corresponds to the centroid of the energy of multiple receiver carriers, phase estimator means coupled to said frequency tracking means for estimating correct phase of a modulated carrier with respect to a reference carrier, and phase corrector means for correcting the phase corrupted carrier.

9. A signal processor system for continuously monitoring and compensating for predetermined time variants of an HF media, telephone channels and localized subsystems comprising:

a quadrature demodulator means for demodulating a received signal into in-phase and quadrature demodulated baseband signal components, adaptive matched filter means having 63 stages coupled to said quadrature demodulator said adaptive matched filters compensating for residual carrier phase inaccuracies, summing means coupled to said adaptive matched filter means for summing the in-phase and quadrature signal components, and adaptive transversal equalizer means having 65 stages coupled to said summing means said adaptive transversal equalizer means for controllably eliminating intersymbol interference.

10. A signal processor system as recited in claim 9 including low pass filter (LPF) means, coupled to said quadrature demodulator means and to said adaptive matched filter means, for low pass filtering the baseband signal.

11. A signal processor system as recited in claim 10 including analog-to-digital (A/D) converter means, coupled to said LPF means and said adaptive matched filter means, for converting the baseband signal to a digital signal.

12. A signal processor system as recited in claim 11 including first pseudo-noise (PN) filter means, coupled to said A/D converter and to said adaptive matched filter means, for filtering a PN signal.

13. A signal processor system as recited in claim 12 including first tap weight calculator means, coupled to said first PN filter means and to said adaptive matched filter means, for calculating tap weight values for said adaptive matched filter means.

14. A signal processor system as recited in claim 13 including second PN filter means, coupled to said transversal equalizer, for further filtering the PN signal.

15. A signal processor system as recited in claim 14 wherein said transversal equalizer means has a predetermined number of adjustable taps and including second tap weight calculator means, coupled to said second PN filter means and to said adaptive transversal equalizer means, for calculating the tap weight values for said adaptive transversal equalizer means.

16. A signal processor system as recited in claim 15 including automatic gain control AGC means, coupled to said quadrature demodulators and to said second PN filter means, for providing automatic gain adjustment to said signal processor system.

17. A signal processor system as recited in claim 15 including means for updating said adaptive filter means substantially every 13.1 milliseconds.

18. A method of processing HF electronic signals to equalize an HF channel comprising the steps of:

a. quadrature demodulating a passband signal to baseband quadrature component signals;

b. low pass filtering the baseband signals through low pass filters (LPF's);
c. processing the low pass filtered baseband signals through adaptive matched filters;
d. adding the adaptive match filtered baseband signals; and,
e. equalizing the added signals to reduce intersymbol interference.

19. A method as recited in claim 18 including the step of updating the match filtered baseband signal every 13.1 milliseconds.

20. An automated real-time equalized modem (ARTEM) system employing multi-level pulse amplitude modulation-single side band (PAM-SSB) modulation and continuous real-time automatic channel measurement and equalization of time variants of propagation characteristics of the channel comprising:

a. modulating means for providing at least 15 level PAM-SSB modulation;
b. pseudo-noise (PN) sequence generator means coupled to said modulation means said PN generator for generating PN signal sequences of predetermined length;
c. transmitter means, coupled to said modulation means, for transmitting modulated signals;
d. receiver means responsive to said transmitter means for receiving the transmitted signals, said receiver means further comprising:

α. signal processor for processing the received modulated signal, said signal processor means comprising: an in-phase demodulator means for demodulating the received signal, adaptive matched filter means coupled to said demodulator means and responsive to the PN signal sequence for compensating residual carrier phase inaccuracies, and adaptive transversal equalizer means coupled to said matched filter means having adjustable tap gains for controllably eliminating intersymbol interference;

β. phase correction and carrier recovery means for correcting phase and recovering the received signal, said phase correction and carrier recovery means coupled to said signal processor means; and, γ. data detect error correction means for converting a predetermined number of quantization levels to at least 15, and detecting and correcting decoding errors.

* * * * *